US010313590B2

(12) United States Patent
Ishikawa

(10) Patent No.: US 10,313,590 B2
(45) Date of Patent: Jun. 4, 2019

(54) DRIVE DEVICE AND METHOD FOR CONTROLLING THE DRIVE DEVICE

(71) Applicant: OLYMPUS CORPORATION, Hachioji-shi, Tokyo (JP)

(72) Inventor: Takashi Ishikawa, Hachioji (JP)

(73) Assignee: OLYMPUS CORPORATION, Tokyo (JP)

( * ) Notice: Subject to any disclaimer, the term of this patent is extended or adjusted under 35 U.S.C. 154(b) by 6 days.

(21) Appl. No.: 15/829,519

(22) Filed: Dec. 1, 2017

(65) Prior Publication Data

US 2018/0205887 A1 Jul. 19, 2018

(30) Foreign Application Priority Data

Jan. 16, 2017 (JP) ................................. 2017-005085

(51) Int. Cl.
H04N 5/232 (2006.01)
H04N 5/225 (2006.01)
G01P 15/105 (2006.01)
G03B 5/00 (2006.01)

(52) U.S. Cl.
CPC ....... *H04N 5/23258* (2013.01); *G01P 15/105* (2013.01); *G03B 5/00* (2013.01); *H04N 5/2253* (2013.01); *H04N 5/23287* (2013.01); *G03B 2205/0007* (2013.01); *G03B 2205/0069* (2013.01); *H04N 5/23293* (2013.01)

(58) Field of Classification Search
CPC ............. H04N 5/23258; H04N 5/2253; H04N 5/23287; H04N 5/23293; G01P 15/105; G03B 5/00; G03B 2205/0007; G03B 2205/0069
See application file for complete search history.

(56) References Cited

U.S. PATENT DOCUMENTS

| 8,995,241 B1* | 3/2015 | Heo ....................... G02B 7/023 369/44.14 |
| 2013/0300336 A1* | 11/2013 | Ishikawa ............... H04N 5/2253 318/610 |
| 2014/0368676 A1* | 12/2014 | Yoshimuta ............. H04N 5/232 348/207.99 |
| 2017/0264814 A1* | 9/2017 | Park ................... H04N 5/23212 |

FOREIGN PATENT DOCUMENTS

JP 2015088956 A * 5/2015 ............. H04N 5/232
JP 2015088956 A 5/2015

* cited by examiner

*Primary Examiner* — Nhan T Tran
(74) *Attorney, Agent, or Firm* — Holtz, Holtz & Volek PC

(57) ABSTRACT

A drive device includes a noise signal calculation unit, a signal correction unit, and a drive controller. The noise signal calculation unit calculates a noise signal corresponding to a magnetic flux generated from a current flowing through a drive coil. The signal correction unit corrects a detection signal detected by a detector based on the noise signal. The drive controller controls a drive signal to be applied to the drive coil based on a corrected signal obtained by the signal correction unit. The noise signal calculation unit acquires an amplitude of a predetermined frequency band including a frequency of a high-frequency drive signal, and calculates the noise signal included in the detection signal based on the acquired amplitude.

6 Claims, 18 Drawing Sheets

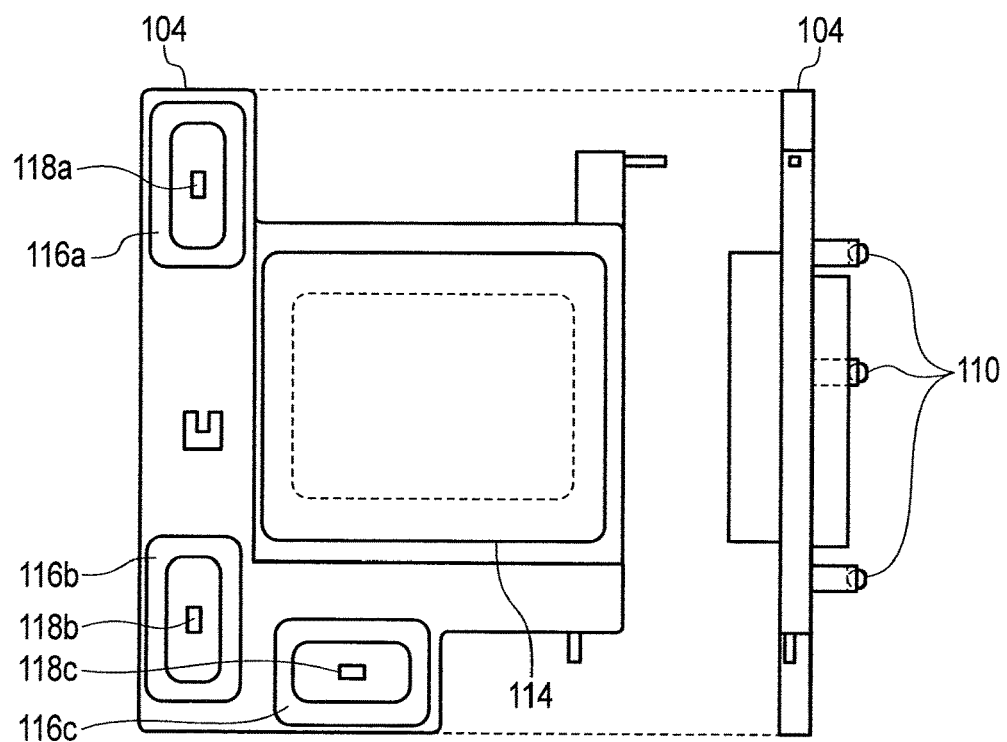
F I G. 4
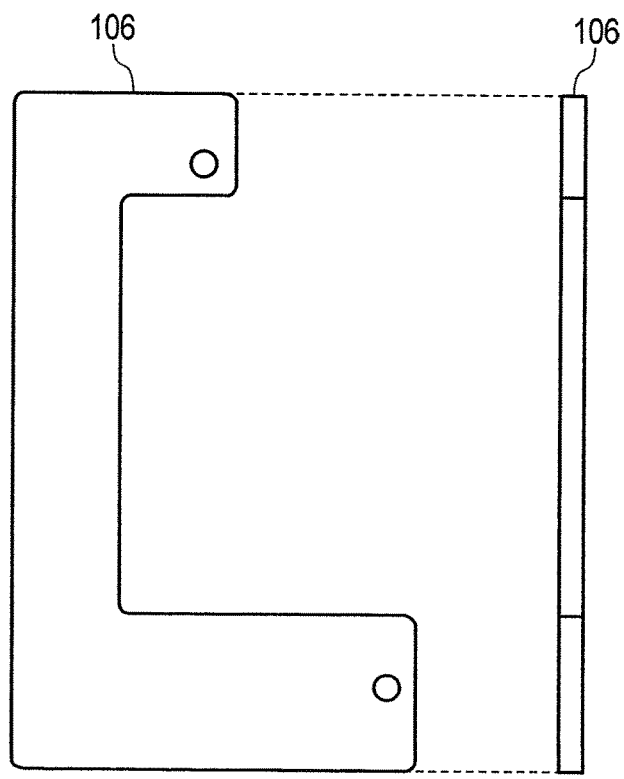
F I G. 5

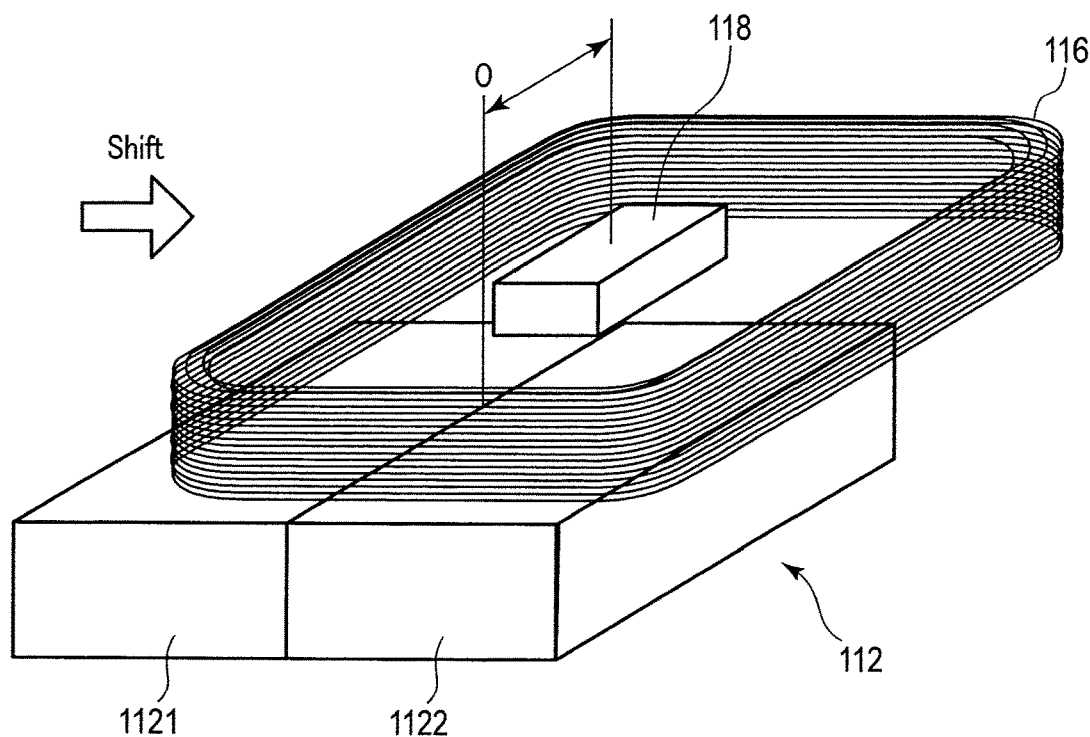
F I G. 11
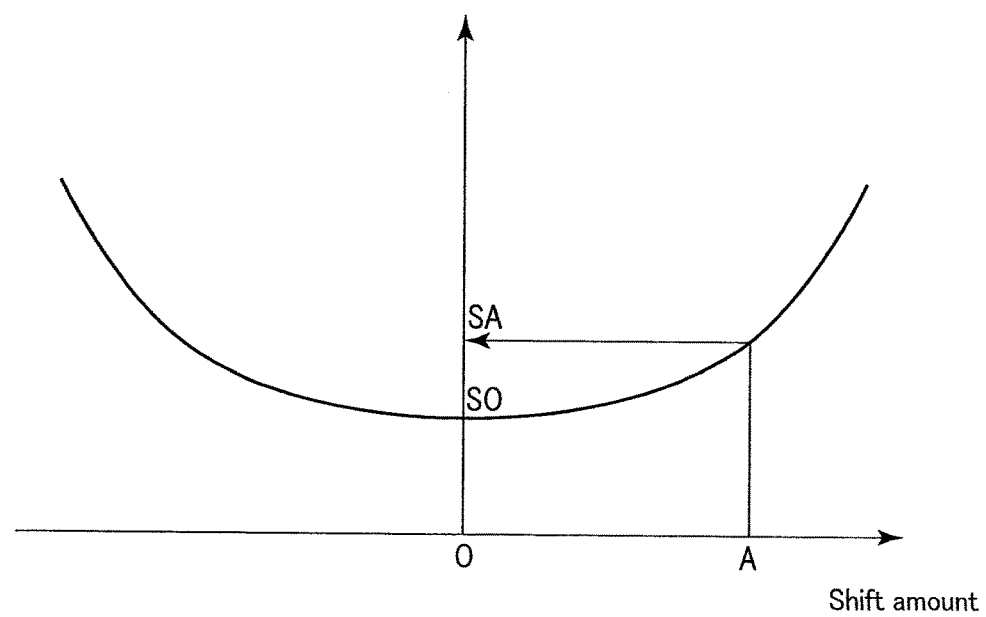
F I G. 12

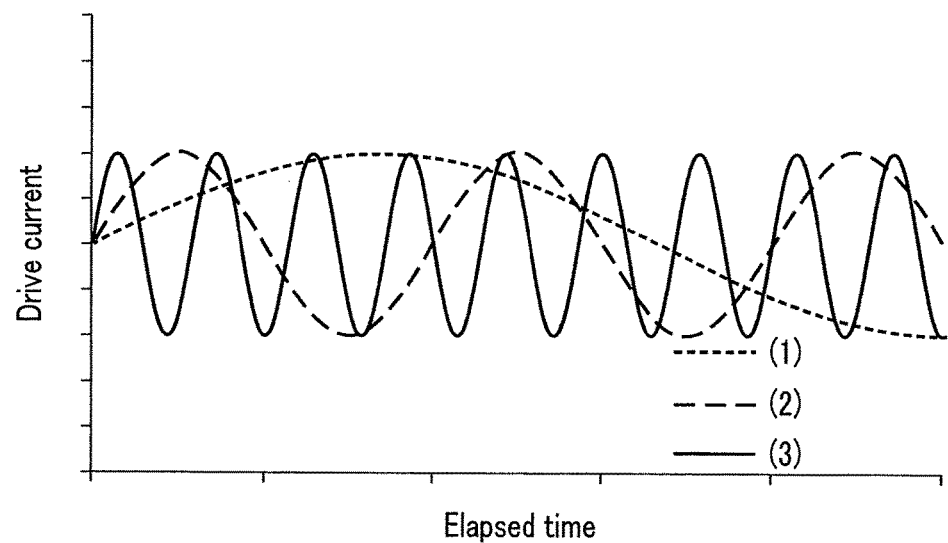
F I G. 18A
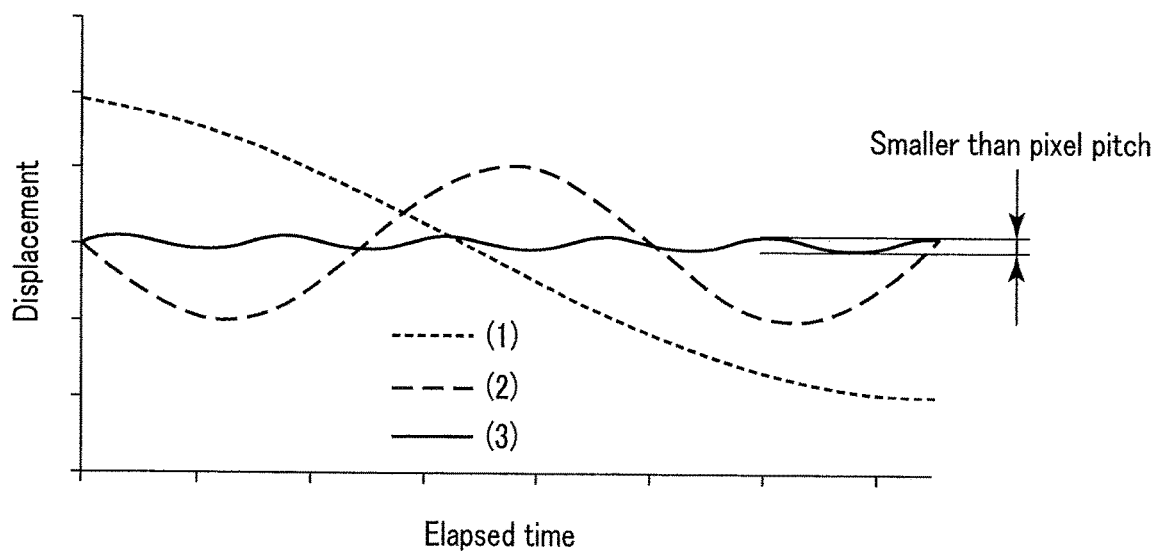
F I G. 18B

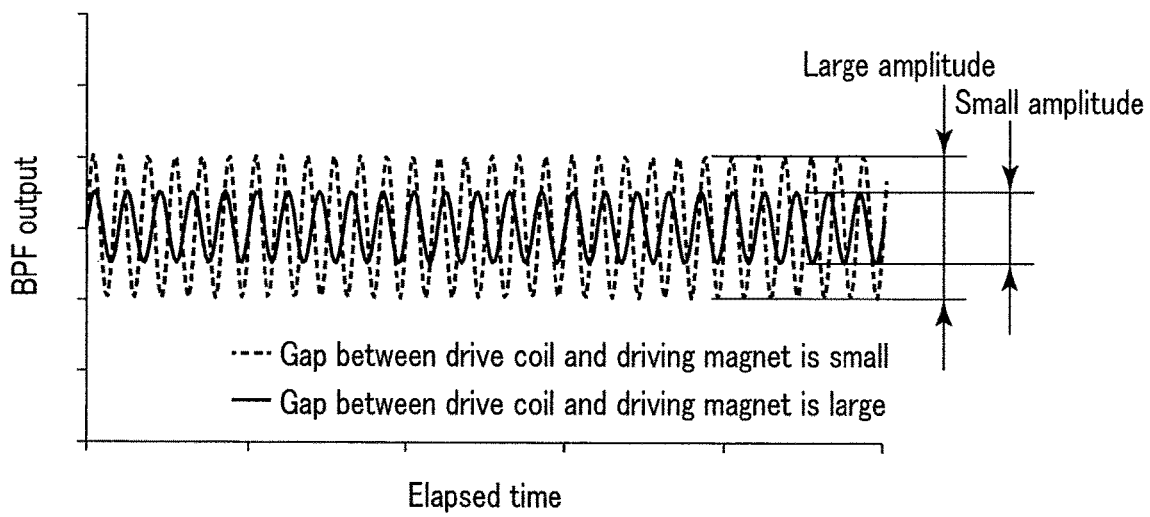
F I G. 23
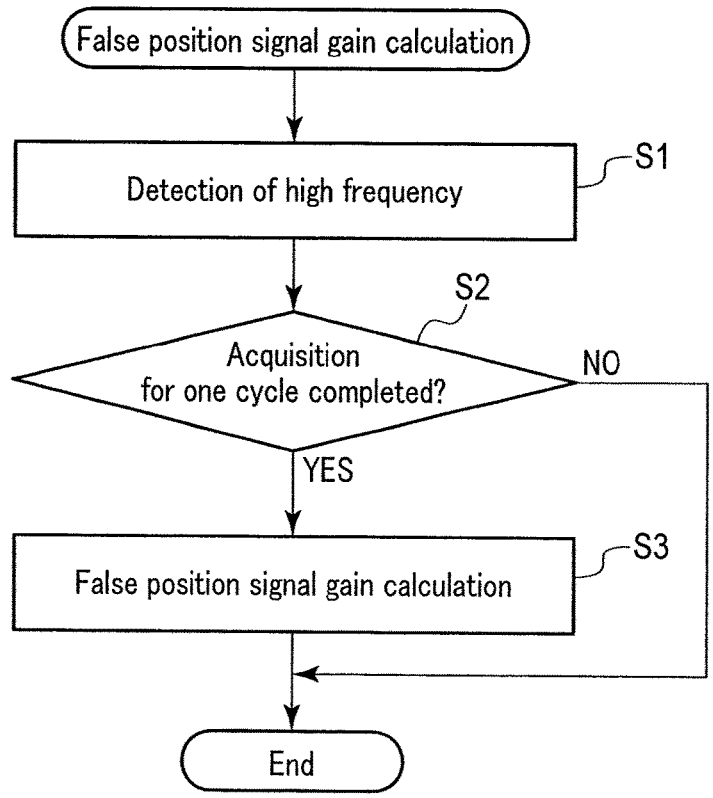
F I G. 24

DRIVE DEVICE AND METHOD FOR CONTROLLING THE DRIVE DEVICE

CROSS-REFERENCE TO RELATED APPLICATIONS

This application is based upon and claims the benefit of priority from the prior Japanese Patent Application No. 2017-005085, filed Jan. 16, 2017 the entire contents of which are incorporated herein by reference.

BACKGROUND OF THE INVENTION

1. Field of the Invention

The present invention relates to a drive device and a method for controlling the same.

2. Description of the Related Art

In digital cameras or the like, blur correction is known as a function to suppress image blurring which occurs in a video signal generated by an imaging element due to camera shake when the imaging element or a lens is moved. To perform this kind of blur correction function, a drive device is known, in which a movable frame including a lens or an imaging element is configured to be moved relative to a fixed frame by a voice coil motor (VCM) using a drive coil and a driving magnet.

In the VCM, a Hall element is used as a detector to detect a position of the movable frame relative to the fixed frame. For example, a driving magnet and another magnet, that is, a position detecting magnet are placed in the fixed frame, and a Hall element is placed in the movable frame. In this placement, a position of the movable frame relative to the fixed frame is detected based on a change of a flux from the position detecting magnet detected by the Hall element in accordance with a movement of the movable frame relative to the fixed frame.

To downsize the drive device, in some configurations, a single magnet is used for both driving and position detecting, or a driving magnet and a position detecting magnet are placed in proximity. In those configurations, a drive coil and a Hall element are also placed in proximity. Therefore, the Hall element detects not only a magnetic flux from the position detecting magnet but also a magnetic flux from the drive coil. Due to the magnetic flux from the drive coil, a detection signal from the Hall element may include a false position signal. If position detection is performed on the basis of the detection signal including a false position signal, a position detection error may occur. Jpn. Pat. Appln. KOKAI Publication No. 2015-088956 proposes an imaging device, in which, to cancel a position detection error due to a magnetic flux from a drive coil as described above, a correction signal for a detection signal is generated using a time constant and a field noise factor that was determined in advance to correct a detection signal of a Hall element in accordance with a drive current.

BRIEF SUMMARY OF THE INVENTION

According to a first aspect of the invention, there is provided a drive device comprising: a fixed frame on which one of a drive coil and a magnet facing the drive coil is disposed; a movable frame on which another one of the drive coil and the magnet is disposed and which is movable relative to the fixed frame; a detector that is disposed on one of the fixed frame and the movable frame on which the drive coil is disposed, and that detects and outputs a detection signal corresponding to a magnetic flux of the magnet; a noise signal calculation unit that calculates a noise signal corresponding to a magnetic flux generated from a current flowing through the drive coil; a signal correction unit that corrects the detection signal detected by the detector based on the noise signal; and a drive controller that controls, based on a corrected signal obtained from correction by the signal correction unit, a drive signal to be applied to the drive coil and that drives the movable frame to a position corresponding to the corrected signal, wherein from the detection signal detected by the detector when a drive signal, in which a high-frequency drive signal is superimposed on a drive current to drive the movable frame, is applied to the drive coil, the noise signal calculation unit acquires an amplitude of a predetermined frequency band including a frequency of the high-frequency drive signal, and calculates the noise signal included in the detection signal based on the acquired amplitude.

According to a second aspect of the invention, there is provided a method for controlling a drive device comprising: a fixed frame on which one of a drive coil and a magnet facing the drive coil is disposed; a movable frame on which another one of the drive coil and the magnet is disposed and which is movable relative to the fixed frame; and a detector that is disposed on one of the fixed frame and the movable frame on which the drive coil is disposed, and that detects and outputs a detection signal corresponding to a magnetic flux of the magnet, the method comprising: applying a drive signal, in which a high-frequency drive signal is superimposed on a drive current to drive the movable frame, to the drive coil; acquiring an amplitude of a predetermined frequency band including a frequency of the high-frequency drive signal from the detection signal detected by the detector; calculating a noise signal included in the detection signal based on the acquired amplitude; correcting the detection signal detected by the detector based on the noise signal; and controlling, based on a corrected signal obtained from the correcting, a drive signal to be applied to the drive coil and driving the movable frame to a position corresponding to the corrected signal.

Advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWINGS

The accompanying drawings, which are incorporated in and constitute a part of the specification, illustrate embodiments of the invention, and together with the general description given above and the detailed description of the embodiments given below, serve to explain the principles of the invention.

FIG. 4 is a diagram showing a configuration of a movable frame.

FIG. 5 is a diagram showing a configuration of a yoke.

FIG. 11 is a diagram showing a relationship among a magnet, a drive coil, and a Hall element in a state where the movable frame has been shifted in XY directions from the fixed frame.

FIG. 12 is a diagram showing a dependence of the amount of a false position signal on a shift amount.

FIG. 18A is a diagram showing (1) a drive current in a low-frequency band, (2) a drive current in a mid-frequency band, and (3) a drive current in a high-frequency band.

FIG. 18B is a diagram showing displacements of the movable frame when the drive currents shown in FIG. 18A are applied to the motor.

FIG. 23 is a diagram showing a relationship between a BPF output and a distance from a magnet to a drive coil.

FIG. 24 is a flowchart of a process for calculating a false position signal gain.

DETAILED DESCRIPTION OF THE INVENTION

Figure 1:
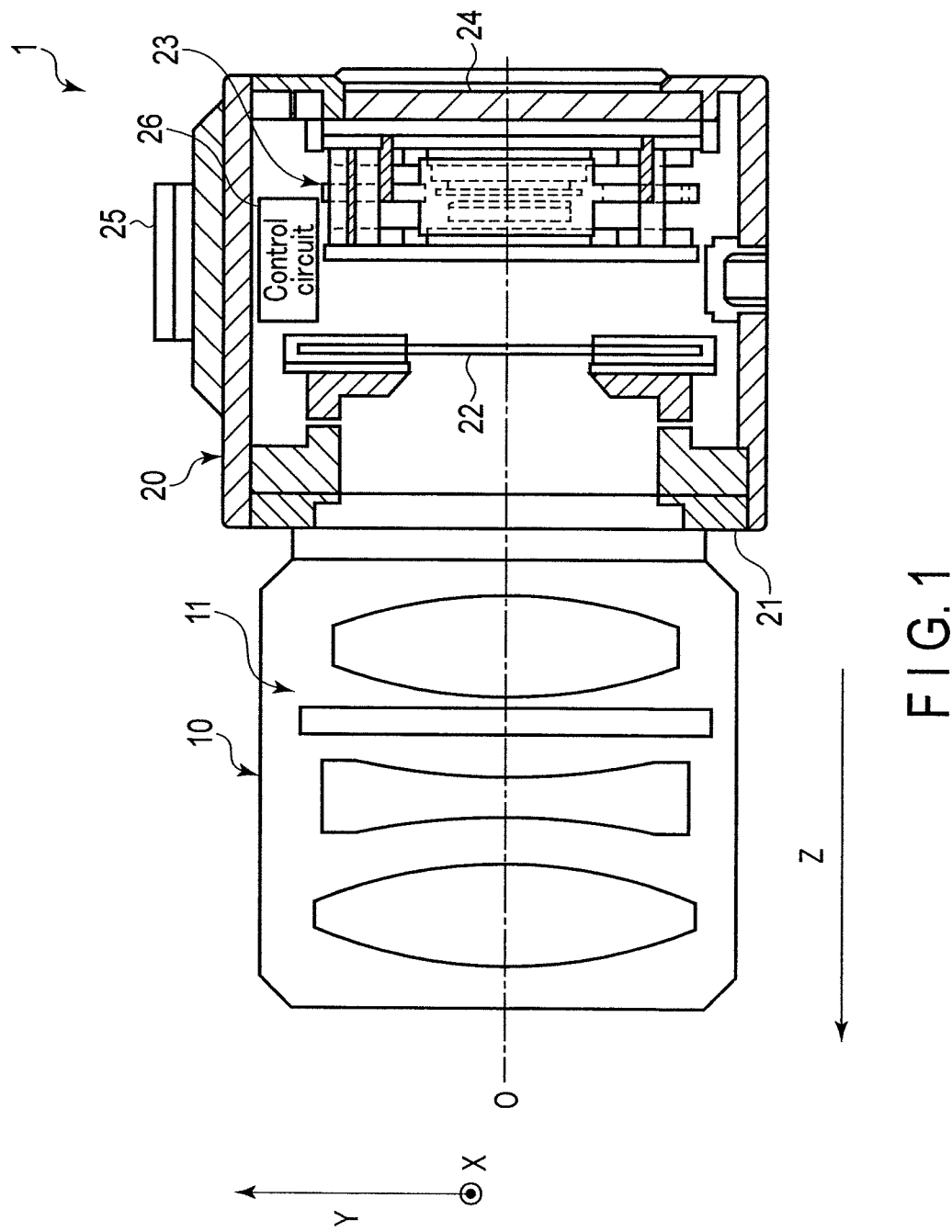
FIG. 1 is a schematic diagram showing a configuration of an imaging device according to an embodiment of the present invention.

Embodiments of the present invention will be described with reference to the accompanying drawings. FIG. 1 is a schematic diagram showing a configuration of an imaging device according to an embodiment of the present invention. The imaging device 1 shown in FIG. 1 includes an interchangeable lens 10 and a main body 20. The interchangeable lens 10 is attached to the main body 20 via a mount 21 mounted on the main body 20. The interchangeable lens 10 and the main body 20 are communicatably connected by the attachment of the interchangeable lens 10 to the main body 20. As a result, the interchangeable lens 10 and the main body 20 operate in cooperation. The imaging device 1 is not necessarily a lens-exchangeable type imaging device. For example, the imaging device 1 may be a lens-integrated type imaging device. Furthermore, the imaging device shown in FIG. 1 maybe of various types of imaging devices, such as a digital camera, that includes a camera shake correction unit 23.

The interchangeable lens 10 includes an optical system 11. The optical system 11 includes, for example, a plurality of lenses and an aperture, and causes an optical beam from an object (not shown) to be incident on the camera shake correction unit 23 of the main body 20. The optical system 11 shown in FIG. 1 is comprised of a plurality of lenses; however, the optical system 11 may be comprised of one lens. The optical system 11 may include a zoom lens in addition to a focus lens. In these cases, at least a part of the lenses of the optical system 11 is freely movable in a z direction along an optical axis O.

The main body 20 includes a shutter 22, the camera shake correction unit 23, a monitor 24, an operation unit 25, and a control circuit 26.

The shutter 22 is a focal plane shutter disposed, for example, in front of the camera shake correction unit 23 (referred to as a positive side in the z direction). Opening of the shutter 22 causes the camera shake correction unit 23 to be exposed. Closure of the shutter 22 causes the camera shake correction unit 23 to be shielded from light.

The camera shake correction unit 23, as an example of the drive device, includes an imaging element and images an object (not shown) thereby to generate a video signal relating to the object. Furthermore, the camera shake correction unit 23 moves a movable frame relative to a fixed frame by a voice coil motor (VCM) using a coil and a magnet, thereby to correct an object light incident on the imaging element and to correct image blurring, which occurs in the video signal due to a camera shake or the like. Configurations of the camera shake correction unit 23 will be detailed later.

The monitor 24 is, for example, a liquid crystal display, and displays an image based on a video signal generated by the camera shake correction unit 23. The monitor 24 also displays a menu window that allows a user to perform various settings of the imaging device 1. The monitor 24 may include a touch panel.

The operation unit 25 includes, for example, a release button. The release button is a button that allows the user to provide an instruction to start imaging by the imaging device 1. The operation unit 25 includes various operation parts in addition to the release button.

The control circuit 26 includes, for example, a CPU and a memory, and controls all operations of the imaging device 1, such as an imaging operation in the imaging device 1.

Figure 2:
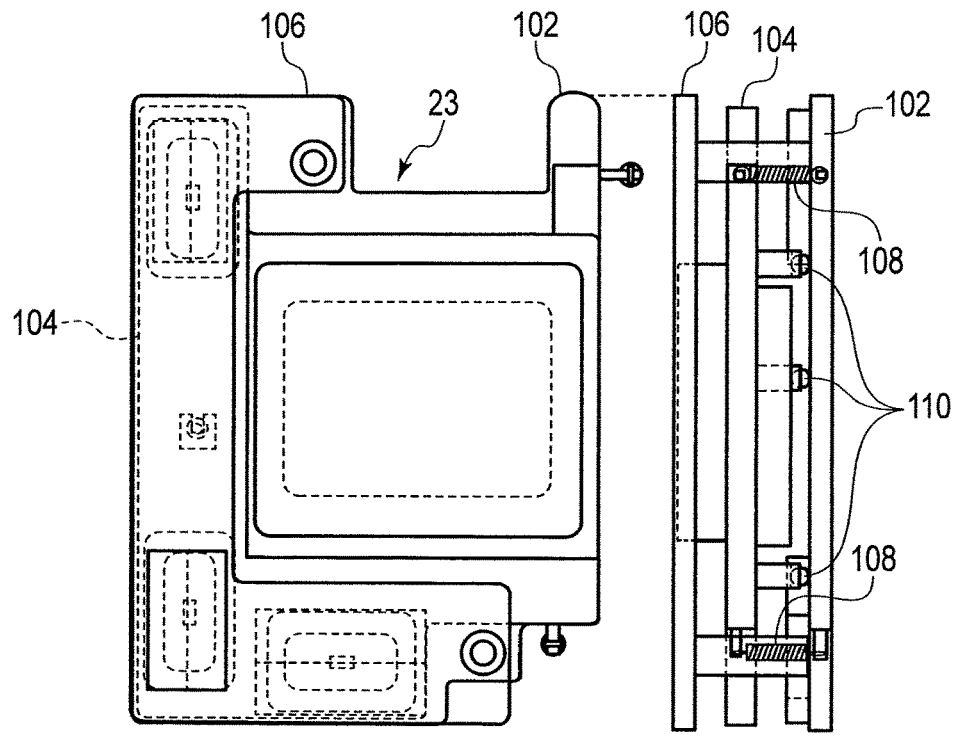
FIG. 2 is a schematic diagram showing a configuration of a camera shake correction unit as an example of a drive device according to the embodiment of the present invention.

The camera shake correction unit 23 will be further explained. FIG. 2 is a schematic diagram showing a configuration of the camera shake correction unit 23 as an example of a drive device according to the embodiment of the present invention. A left part of FIG. 2 is a front view of the camera shake correction unit 23, and a right part is a side view of the same. The camera shake correction unit 23 shown in FIG. 2 is a device to correct an object light incident on the imaging element. This is a drive device that performs blur correction drive to drive the imaging element in directions parallel to an image surface (XY directions in FIG. 1) to prevent noise from being caused in a video signal due to image blurring. In this configuration, it is assumed that the front of the camera shake correction unit 23 is a surface which faces the positive side in a Z direction in FIG. 1. Furthermore, when the camera shake correction unit 23 is placed as shown in FIG. 2, the horizontal direction is an X direction in FIG. 1, and the vertical direction is a Y direction in FIG. 1.

Broadly, the camera shake correction unit 23 shown in FIG. 2 includes a fixed frame 102, a movable frame 104, and a yoke 106. The fixed frame 102 is fixed to the main body 20 of the imaging device 1. As shown in the side view, the yoke 106 is fixed to the fixed frame 102 at a predetermined distance from the fixed frame 102. The movable frame 104 is interposed between the fixed frame 102 and the yoke 106, and attached to the fixed frame 102 with urging force toward the fixing fixed frame 102 by urging springs 108. Three balls 110 are arranged on a rear surface of the movable frame 104. The movable frame 104 is configured to smoothly move on the surface of the fixed frame 102 by the three balls 110.

Figure 3:
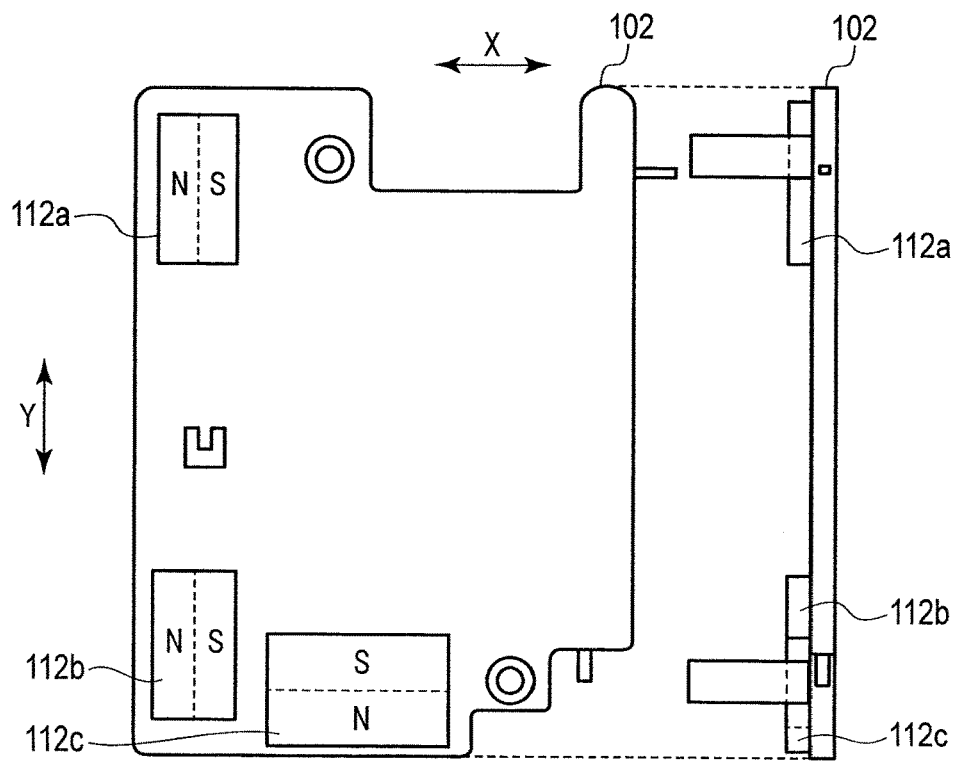
FIG. 3 is a diagram showing a configuration of a fixed frame.

FIG. 3 is a diagram showing a configuration of the fixed frame 102. In FIG. 3, a left part is a front view of the fixed frame 102, and a right part is a side view of the same. As shown in FIG. 3, three magnets 112a, 112b, and 112c are disposed on the fixed frame 102.

The magnet 112a is disposed on an upper left corner in the front surface of the fixed frame 102. The magnet 112a includes a first magnet and a second magnet. The first magnet is disposed so that the longitudinal direction coincides with the Y direction, and a north pole faces the movable frame 104. The second magnet is disposed so that the longitudinal direction coincides with the Y direction, and a south pole faces the movable frame 104.

The magnet 112b is disposed on a lower left corner in the front surface of the fixed frame 102. The magnet 112b includes a first magnet and a second magnet. The first magnet is disposed so that the longitudinal direction coincides with the Y direction, and a north pole faces the movable frame 104. The second magnet is disposed so that the longitudinal direction coincides with the Y direction, and a south pole faces the movable frame 104.

The magnet 112c is disposed on a bottom center portion in the front surface of the fixed frame 102. The magnet 112c includes a first magnet and a second magnet. The first magnet is disposed so that the longitudinal direction coincides with the X direction, and a north pole faces the movable frame 104. The second magnet is disposed so that the longitudinal direction coincides with the X direction, and a south pole faces the movable frame 104.

The magnet 112a and the magnet 112b are magnets to drive the movable frame in the X direction in FIG. 3, and the magnet 112c is a magnet to drive the movable frame in the Y direction in FIG. 3.

FIG. 4 is a diagram showing a configuration of the movable frame 104. In FIG. 4, a left part is a front view of the movable frame 104, and a right part is a side view of the same. As shown in FIG. 4, the movable frame 104 includes an imaging element 114, three drive coils 116a, 116b, and 116c, and three detectors, namely, Hall elements 118a, 118b, and 118c.

The imaging element 114 is mounted in an opening in a central portion of the movable frame 104. The imaging element 114 images an object and generates an image signal concerning the object. The imaging element 114 converts an image signal to a digital signal and outputs the digital signal.

The drive coil 116a is disposed on an upper left corner in the front surface of the movable frame 104 so as to correspond to the magnet 112a disposed on the fixed frame 102. The drive coil 116a generates a magnetic flux by a current applied thereto.

The drive coil 116b is disposed on a lower left corner in the front surface of the movable frame 104 so as to correspond to the magnet 112b disposed on the fixed frame 102. The drive coil 116b generates a magnetic flux by a current applied thereto.

The drive coil 116c is disposed on a bottom center portion in the front surface of the movable frame 104 so as to correspond to the magnet 112c disposed on the fixed frame 102. The drive coil 116c generates a magnetic flux by a current applied thereto.

The Hall element 118a is disposed in a nearly central portion of a winding, which is a point of application of a driving force of the drive coil 116a. The Hall element 118a outputs a detection signal in accordance with the magnetic flux from the magnet 112a as a position signal indicative of a position of the movable frame 104 relative to the fixed frame 102.

The Hall element 118b is disposed in a nearly central portion of a winding, which is a point of application of a driving force of the drive coil 116b. The Hall element 118b outputs a detection signal in accordance with the magnetic flux from the magnet 112b as a position signal indicative of a position of the movable frame 104 relative to the fixed frame 102.

The Hall element 118c is disposed in a nearly central portion of a winding, which is a point of application of a driving force of the drive coil 116c. The Hall element 118c outputs a detection signal in accordance with the magnetic flux from the magnet 112c as a position signal indicative of a position of the movable frame 104 relative to the fixed frame 102.

FIG. 5 is a diagram showing a configuration of the yoke 106. In FIG. 5, a left part is a front view of the yoke 106, and a right part is a side view of the same. As shown in FIG. 5, the yoke 106 has an almost L shape that faces the magnets 112a, 112b, and 112c of the fixed frame 102 shown in FIG. 3. The yoke 106 is formed of a ferromagnetic material, such as iron, and forms a magnetic circuit among the magnets 112a, 112b, and 112c. Thus, the yoke 106 functions to increase the magnetic flux that the drive coils 116a, 116b, and 116c receive.

Figure 6:
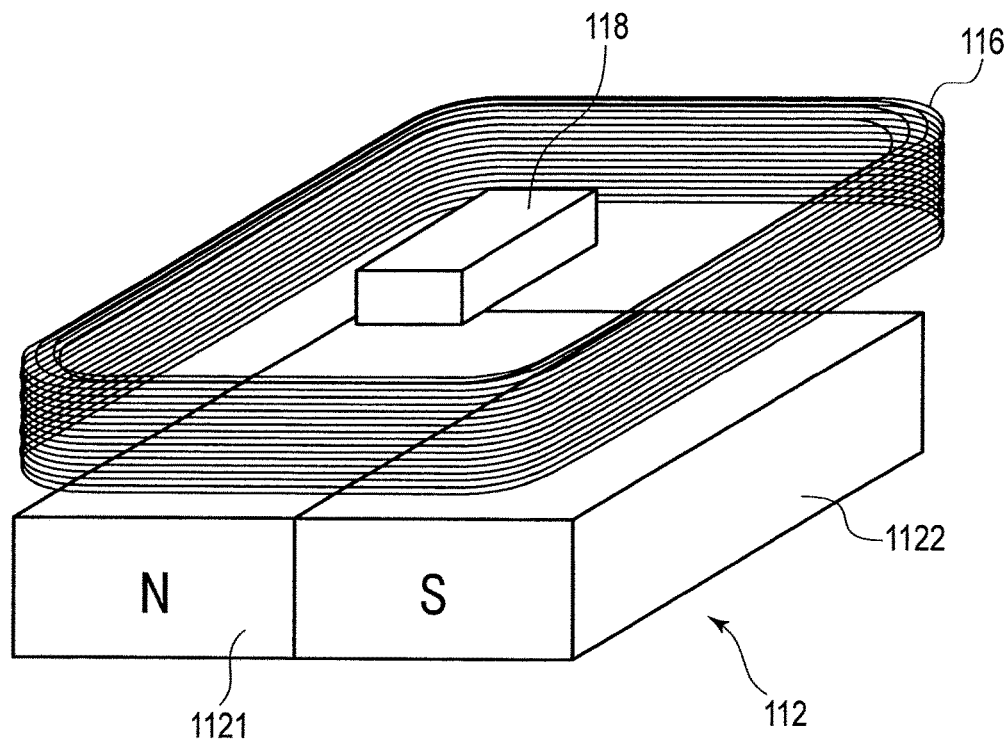
FIG. 6 is a diagram showing a fundamental configuration of a voice coil motor (VCM).

FIG. 6 is a diagram showing a fundamental configuration of a voice coil motor (VCM). FIG. 6 shows a VCM comprised of the magnet 112a and the drive coil 116a. A VCM comprised of the magnet 112b and the drive coil 116b and a VCM comprised of the magnet 112c and the drive coil 116c are the same as the VCM comprised of the magnet 112a and the drive coil 116a in a basic configuration, except for a difference in placement of the magnetic poles of the magnets. Therefore, in FIG. 6, the magnets 112a, 112b, and 112c are collectively indicated as the magnet 112, the drive coils 116a, 116b, and 116c are collectively indicated as the drive coil 116, and the Hall elements 118a, 118b, and 118c are collectively indicated as the Hall element 118. FIG. 6 shows placement of the magnet 112, the drive coil 116, and the Hall element 118 in the VCM in an initial state, when driving has not started, for example, immediately after the power is turned on.

In the initial state, as shown in FIG. 6, the central portion of the winding of the drive coil 116 is placed above a boundary line between the first magnet 1121 and the second magnet 1122 of the magnet 112, and in a central position that halves the boundary line. In this case, the Hall element 118 is also placed in a central position of the boundary line between the first magnet 1121 and the second magnet 1122. With this configuration, the magnet 112 functions as not only a driving magnet that generates a magnetic flux to move the drive coil 116, but also a position detecting magnet that generates a magnetic flux to detect a position by the Hall element 118.

Figure 7:
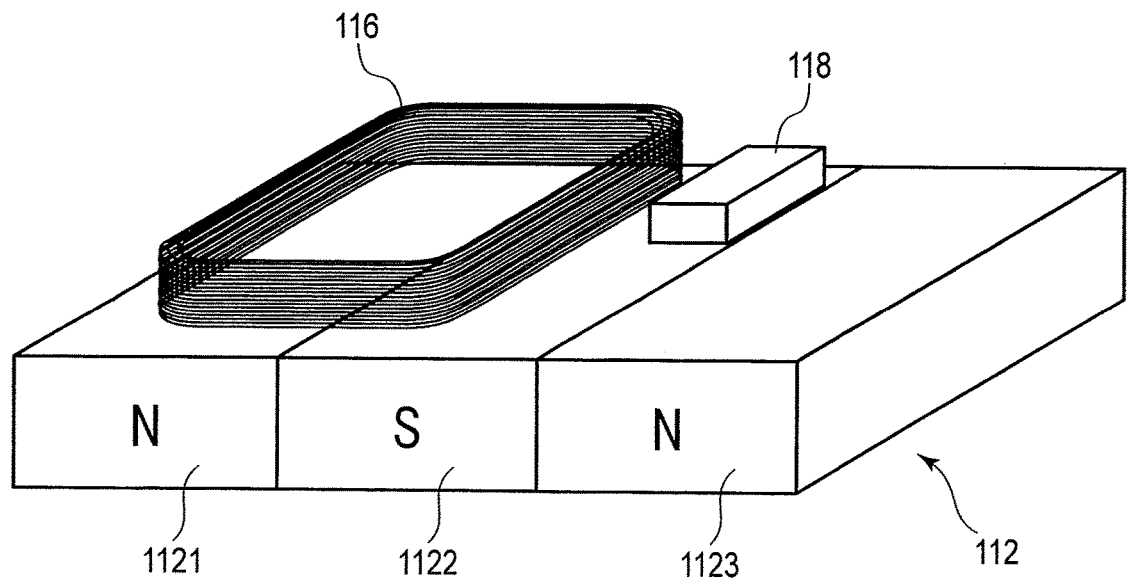
FIG. 7 is a diagram showing a configuration of a modification of a VCM.

FIG. 7 is a diagram showing a configuration of a modification of a VCM. The magnet 112 of the modification shown in FIG. 7 includes a third magnet 1123 in addition to the first magnet 1121 and the second magnet 1122. The third magnet 1123 is disposed so that the pole opposite to that of the second magnet 1122 faces the movable frame 104; that is, in the case of the magnet 112a, the north pole of the third magnet 1123 faces the movable frame 104. In the initial state, as shown in FIG. 7, the central portion of the winding of the drive coil 116 is placed in a central position of a boundary line between the first magnet 1121 and the second magnet 1122 of the magnet 112. On the other hand, the Hall element 118 is placed in a central position of the boundary line between the second magnet 1122 and the third magnet 1123, not the central portion of the winding of the drive coil 116. With this configuration, a set of the first magnet 1121 and the second magnet 1122 of the magnet 112 function as driving magnets that generate a magnetic flux to move the drive coil 116. In addition, a set of the second magnet 1122 and the third magnet 1123 of the magnet 112 function as position detecting magnets that generate a magnetic flux to detect a position by the Hall element 118. Thus, in the example shown in FIG. 7, the second magnet 1122 serves as a magnet for both driving and position detecting.

In the configuration shown in FIG. 6 or FIG. 7, when the drive coil 116 is energized, a magnetic flux and driving force corresponding to the amount and direction of a current flowing through the drive coil 116 are generated. The drive coil 116 moves in accordance with the driving force generated in the drive coil 116. When the drive coil 116 moves, the positional relationship between the Hall element 118 and the position detecting magnet changes. Accordingly, the amount of the magnetic flux received by the Hall element 118 changes, and the amount of the detection signal output by the Hall element 118 also changes. Thus, a relative position between the drive coil 116 and the Hall element 118 can be detected from the detection signal output by the Hall element 118.

The operations described above are performed for the VCM comprised of the magnet 112a and the drive coil 116a, the VCM comprised of the magnet 112b and the drive coil 116b, and the VON comprised of the magnet 112c and the drive coil 116c in the same manner. At that time, the movable frame 104 moves or rotates relative to the fixed frame 102 by appropriately setting the amounts of drive currents applied to the drive coils 116a, 116b, and 116c. A position of the movable frame 104 relative to the fixed frame 102 is detected from detection signals output by the Hall elements 118a, 118b, and 118c.

Figure 8:
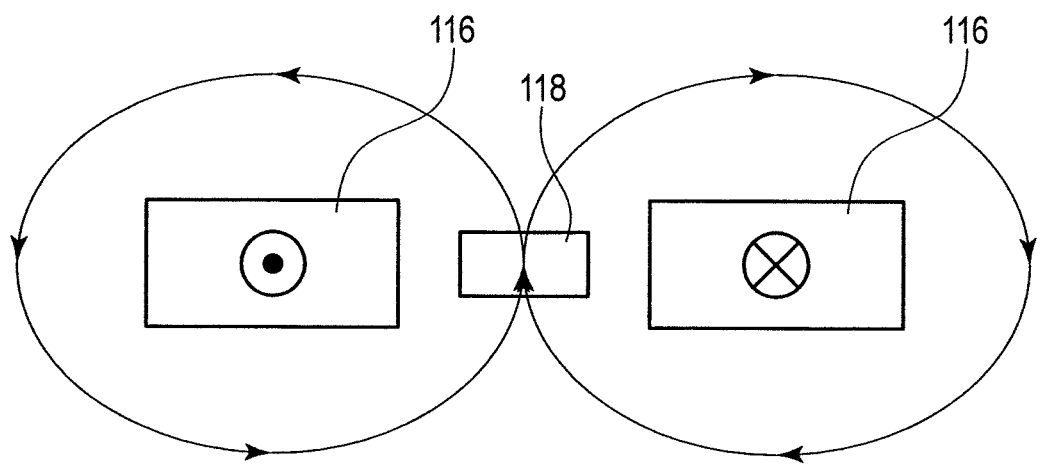
FIG. 8 is a diagram showing a generation principle of a false position signal.

In the VCM shown in FIG. 6, the Hall element 118 is placed in a central portion of the winding of the drive coil 116. In this case, the third magnet 1123 shown in FIG. 7, which is a position detecting magnet, need not be placed; therefore, the VOM can be compact. On the other hand, since the Hall element 118 is placed in the central portion of the winding of the drive coil 116, the Hall element 118 actually receives a magnetic flux from the drive coil 116, not only magnetic fluxes from the first magnet 1121 and the second magnet 1122, as shown in FIG. 8. Therefore, the detection signal output from the Hall element 118 includes a false position signal corresponding to the magnetic flux from the drive coil 116 as a noise signal.

FIG. 8 shows a generation principle of a false position signal in the configuration shown in FIG. 6. However, even in the configuration including the position detecting magnet as shown in FIG. 7, if the drive coil 116 and the Hall element 118 are placed at a short distance, the detection signal output from the Hall element 118 includes a false position signal corresponding to the magnetic flux from the drive coil 116 as in the configuration shown in FIG. 6.

Figure 9:
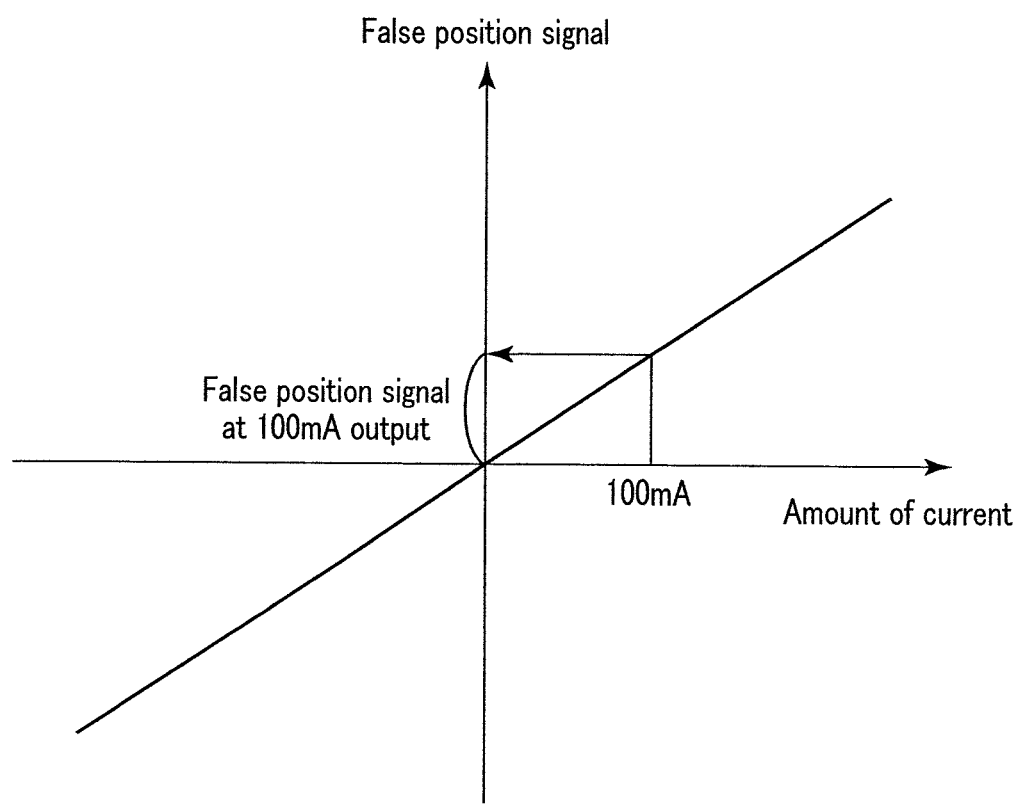
FIG. 9 is a diagram showing an amount of a false position signal output from a Hall element relative to an amount of current applied to a drive coil.

FIG. 9 is a diagram showing an amount of a false position signal output from a Hall element relative to an amount of current applied to a drive coil. Generally, it is known that the amount of a magnetic flux generated in a coil is proportional to the amount of a current applied to the coil. Therefore, the amount of a false position signal is also proportional to the amount of a current, as shown in FIG. 9. For example, if the amount of a current applied to the coil is 100 mA, the Hall element outputs a false position signal corresponding to 100 mA.

Figure 10:
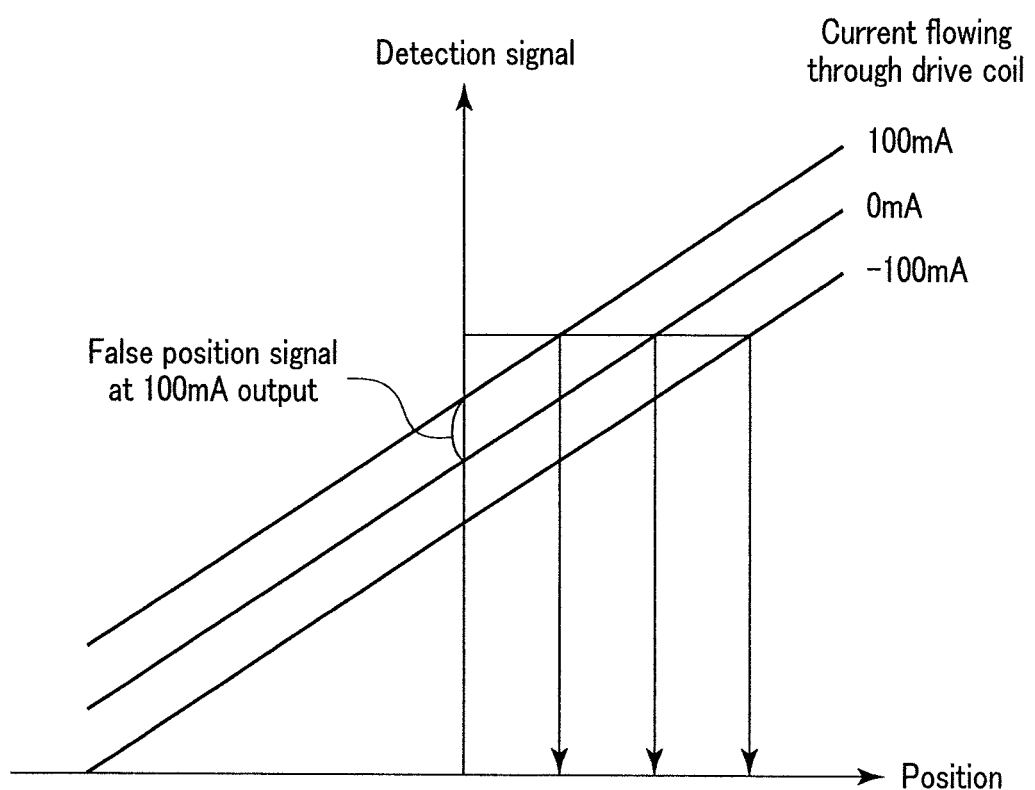
FIG. 10 is a diagram showing a detection deviation of a position due to generation of a false position signal.

FIG. 10 is a diagram showing a detection deviation of a position due to generation of a false position signal. The horizontal axis in FIG. 10 represents a position of the movable frame 104 detected from a detection signal. The vertical axis in FIG. 10 represents an amount of the detection signal. As shown in FIG. 9, the detection signal output from the Hall element 118 includes a false position signal corresponding to the amount of current flowing through the drive coil. Therefore, with regard to the same position of the movable frame 104, when the current flowing through the drive coil 116 is 100 mA, the detection signal includes a false position signal corresponding to 100 mA in addition to the detection signal generated when the current flowing through the drive coil 116 is 0 mA. Similarly, when the current flowing through the drive coil 116 is −100 mA, the detection signal includes a false position signal corresponding to −100 mA in addition to the detection signal generated when the current flowing through the drive coil 116 is 0 mA. If position detection is performed on the basis of the detection signal including a false position signal, the detected position includes a deviation from the actual position. Therefore, to accurately detect a position of the movable frame 104, the false position signal must be removed from the detection signal output from the Hall element 118.

Figure 28:
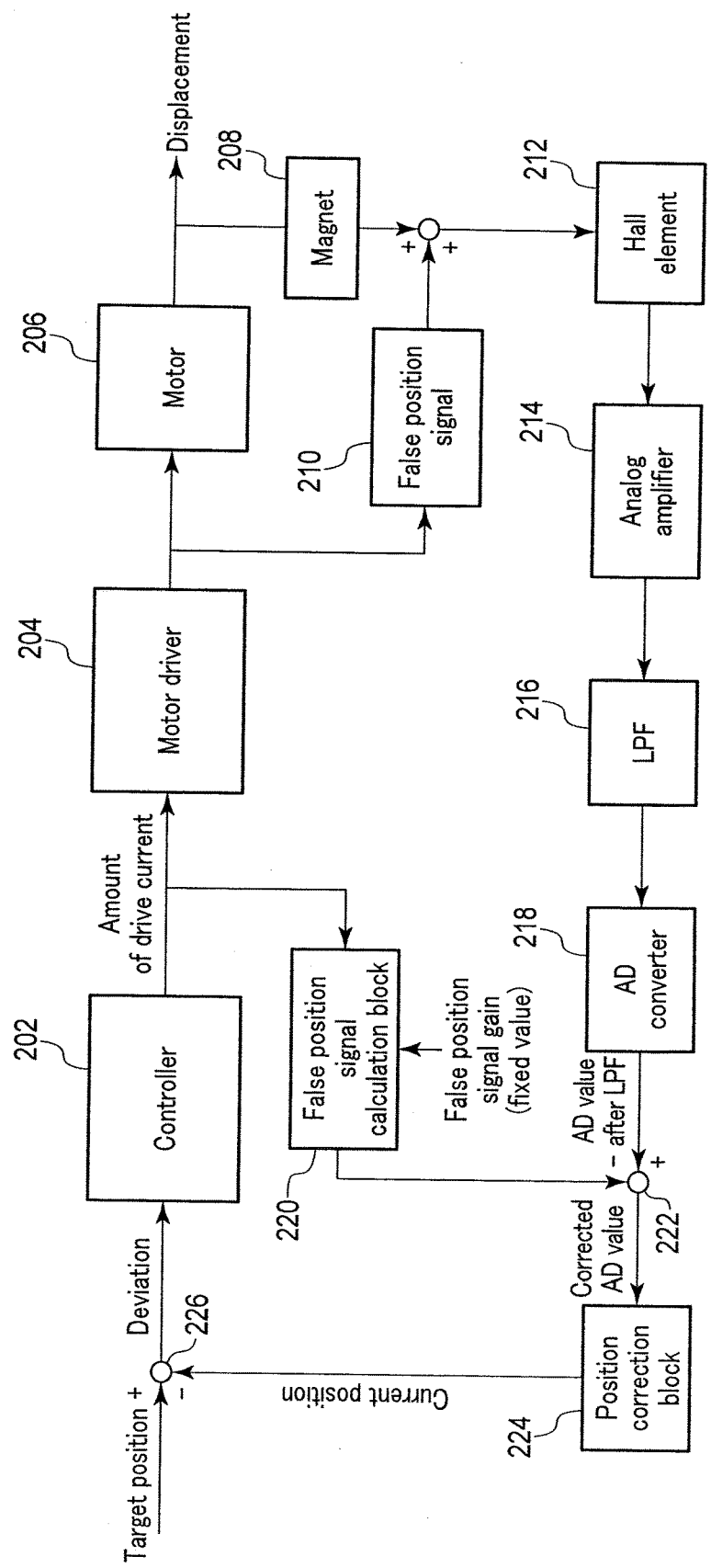
FIG. 28 is a block diagram showing a configuration of a position control system of a camera shake correction unit in an imaging device of prior art.

FIG. 28 is a block diagram showing a configuration of a position control system of a camera shake correction unit 23 in an imaging device 1 of prior art. As shown in FIG. 28, the imaging device 1 includes a controller 202, a motor driver 204, a motor (VCM) 206, a position detecting magnet 208, a Hall element 212, an analog amplifier 214, a low-pass filter (LPF) 216, an AD converter 218, a false position signal calculation block 220, a subtractor 222, a position correction block 224, and a subtractor 226. A part of these components may be configured by software. The configuration shown in FIG. 28 is provided for each of a number of VCMs, although FIG. 28 shows the configuration for only one of the VCMs. Furthermore, FIG. 28 indicates one of the VCMs (each formed of a drive coil and a driving magnet) in the camera shake correction unit 23 as the motor 206, one of the position detecting magnets of the VCM (which also functions as a driving magnet in FIG. 6) as the magnet 208, and one of the Hall elements as the Hall element 212.

The controller 202 is a drive controller that performs feedback control about the position of the movable frame 104 by, for example, PID control. Specifically, the controller 202 includes an IIR filter, performs a filtering process for a deviation signal input from the subtractor 226 to generate a signal indicative of a value of a drive current for driving the motor 206, and outputs the value of the generated drive current to the motor driver 204.

The motor driver 204 displaces the movable frame 104 by applying a drive signal, corresponding to the value of the drive current input from the controller 202, to the motor 206 (actually, the drive coil 116).

The analog amplifier 214 receives a detection signal output from the Hall element 212, and analog-amplifies the received detection signal within an AD conversion range in the AD converter 218. As described above, the detection signal output from the Hall element 212 includes not only a signal based on a magnetic flux from the magnet 208 but also a false position signal 210 based on a magnetic flux from the motor 206 (actually, the drive coil 116). The analog amplifier 214 analog-amplifies the detection signal including a false position signal.

The LPF 216 performs LPF processing for removing a high-frequency component of the detection signal to suppress aliasing that occurs when a detection signal output from the analog amplifier 214 is AD converted.

The AD converter 218 converts a detection signal output from the LPF 216 to a digital signal.

The false position signal calculation block 220 calculates the amount of a false position signal included in a position signal. As described above, a false position signal is proportional to the amount of a current flowing through the drive coil constituting the motor 206. Therefore, the false position signal calculation block 220 calculates the amount of a false position signal by multiplying the value of a drive current, which is calculated by the controller 202, by a false signal gain, which is a predetermined proportionality coefficient determined by characteristics of the drive coil etc.

The subtractor 222 subtracts the value of the false position signal calculated by the false position signal calculation block 220 from an AD value of the detection signal input from the AD converter 218 (including the false position signal). The subtractor 222 outputs the subtraction result to the position correction block 224 as a corrected AD value.

The position correction block 224 generates a current position signal to perform digital correction to control the movable frame 104 to be located at a correct position based on the corrected AD value input from the subtractor 222. The position correction block 224 outputs the generated current position signal to the subtractor 226. The Hall element 212 or the like has temperature characteristics, and can output different detection signals with respect to the same position of the movable frame 104. The position correction block 224 may correct an error due to the temperature characteristics or the like by using a temperature sensor (not shown).

In this embodiment, the position correction block 224 performs software processing; however, a part or all of the block may be constituted by an analog circuit.

The subtractor 226 outputs to the controller 202 a deviation signal corresponding to a difference between a drive target position signal indicative of a drive target position of the movable frame 104 input from, for example, the control circuit 26, and a current position signal generated by the position correction block 224. The controller 202 calculates a drive current based on the deviation signal. As a result, the position of the movable frame 104 moves closer to the drive target position.

Some of the magnetic flux generated in the drive coil 116 is directly received by the Hall element 118, and some is received via the driving magnet 112.

Both the drive coil 116 and the Hall element 118 are disposed on the movable frame 104, and their relative positions are not variable. Therefore, it is considered that the amount of the magnetic flux directly received by the Hall element 118 from the drive coil 116 is almost invariable. Therefore, the false position signal output from the Hall element 118 based on the amount of magnetic flux that the Hall element 118 directly received from the drive coil 116 can be calculated by multiplying the drive current by the constant false position signal gain, as described above.

On the other hand, the position of the magnet 112 relative to the drive coil 116 and the Hall element 118 may vary. Due to a change in relative position, the amount of the magnetic flux received from the drive coil 116 via the driving magnet 112 is variable. The false position signal due to the change in magnetic flux cannot be calculated by multiplying the drive current by the constant false position signal gain.

FIG. 11 is a diagram showing a relationship among the magnet 112, the drive coil 116, and the Hall element 118 in a state where the movable frame 104 has been shifted in XY directions from the fixed frame 102. As described before, when the drive coil 116 is energized, the movable frame 104 moves relative to the fixed frame 102. Even in this case, the relative position between the drive coil 116 and the Hall element 118 in the movable frame 104 does not vary. On the other hand, the position of the magnet 112 on the fixed frame 102 relative to the drive coil 116 and the Hall element 118 varies in accordance with the amount of movement (the shift amount) of the movable frame 104 relative to the fixed frame 102. At this time, the magnetic flux received by the magnet 112 from the drive coil 116 decreases.

FIG. 12 is a diagram showing a dependence of the amount of a false position signal on a shift amount. In FIG. 12, the horizontal axis represents a shift amount of the drive coil 116 relative to the magnet 112. The shift amount corresponds to the amount of a shift from the central position 0 of the boundary line between the first magnet 1121 and the second magnet 1122 of the magnet 112 shown in FIG. 11. The vertical axis in FIG. 12 represents an amount of a false position signal per unit of current. As shown in FIG. 12, even if the amount of a current applied to the drive coil does not change, the amount of a false position signal output from the Hall element 118 increases as the shift amount increases and the magnetic flux from the drive coil 116 received by the magnet 112 decreases. For example, when the shift amount is A, the amount of the false position signal is SA, which is greater than S0 of a false position signal generated when the shift amount is 0.

Figure 13:
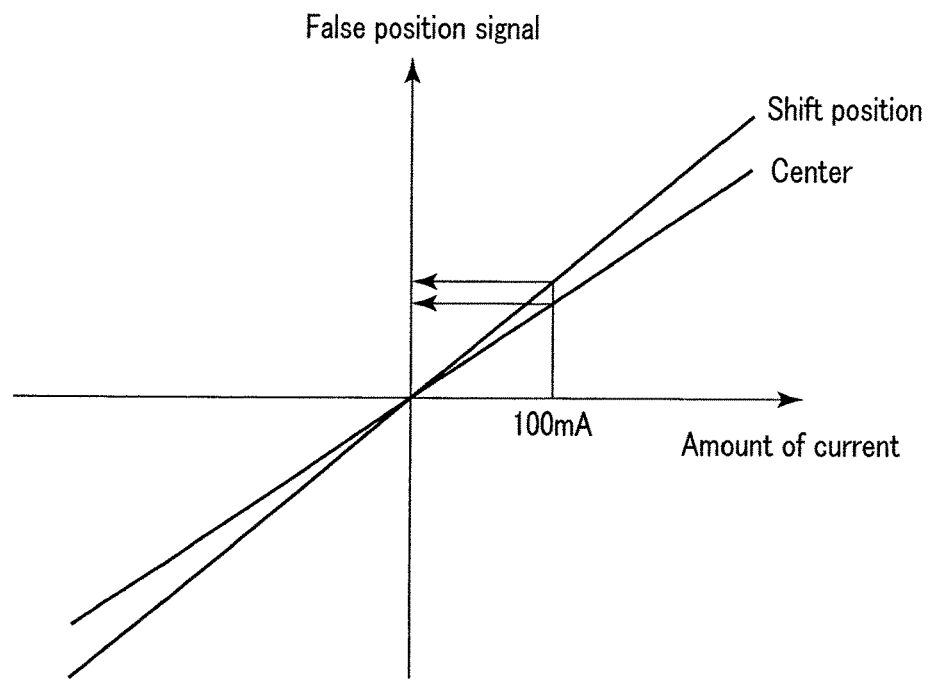
FIG. 13 is a diagram showing an amount of a false position signal output from a Hall element relative to an amount of a current applied to a drive coil in consideration of the shift amount of the movable frame.

FIG. 13 is a diagram showing an amount of a false position signal output from a Hall element relative to an amount of a current applied to the drive coil 116 in consideration of the shift amount of the movable frame 104. As shown in FIG. 9, the amount of a false position signal from the drive coil 116 is proportional to the amount of current. However, if the shift amount varies, even if the same current is applied to the drive coil 116, the amount of a false position signal output from the Hall element 118 varies.

Figure 14:
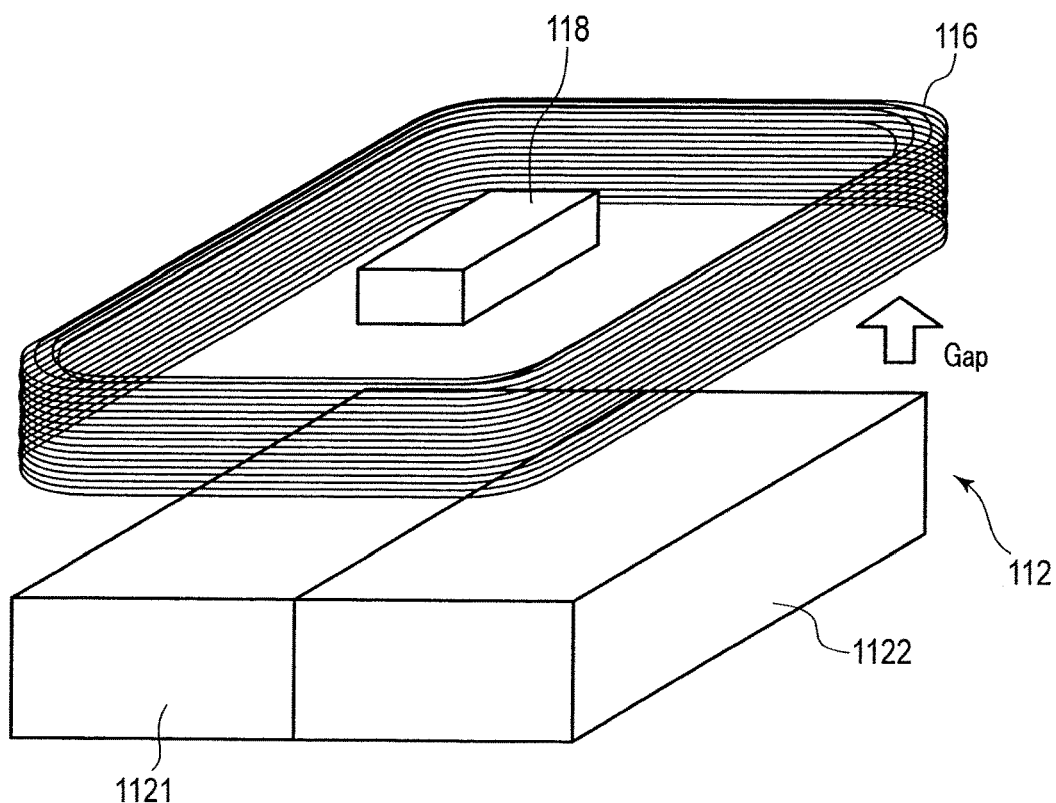
FIG. 14 is a diagram showing a relationship among a magnet, a drive coil, and a Hall element in a state where a gap misalignment of the movable frame relative to the fixed frame occurs.

FIG. 11 shows a change in false position signal in accordance with movement of the movable frame 104 relative to the fixed frame 102 in the XY directions. Actually, a deviation in the Z direction (gap misalignment) may arise between the fixed frame 102 and the movable frame 104. If a gap misalignment as shown in FIG. 14 arises, the gap misalignment may also arise between the magnet 112 and the drive coil 116 or the Hall element 118.

Figure 15A:
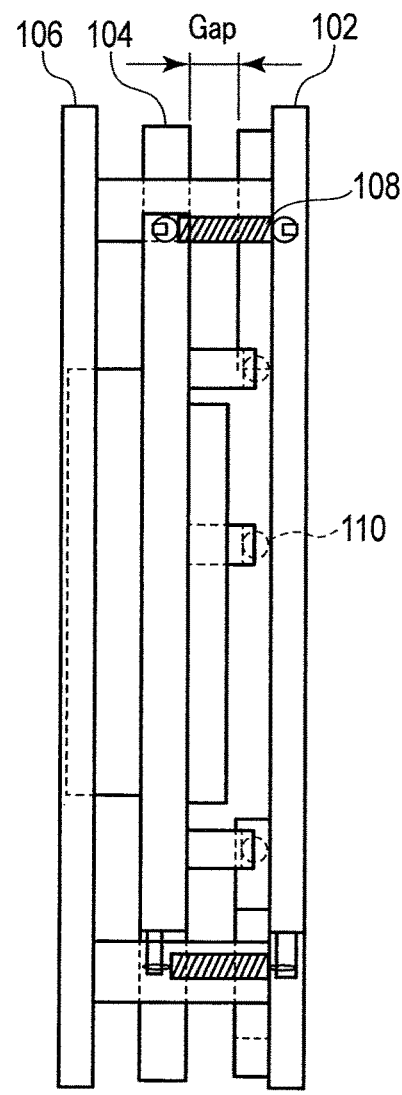
FIG. 15A is a diagram for explaining the gap misalignment.
Figure 15B:
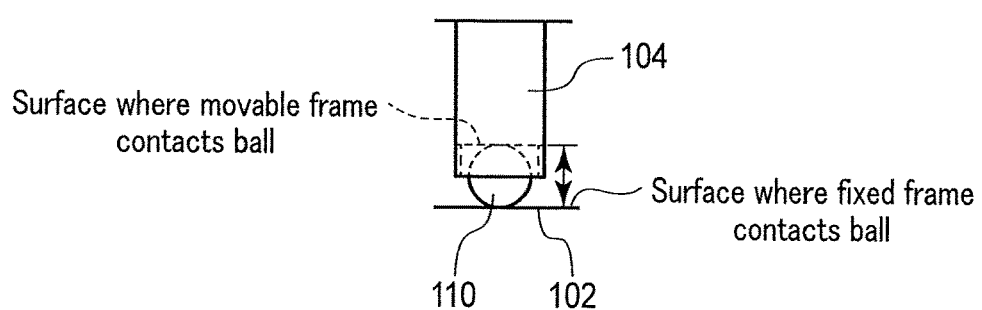
FIG. 15B is a diagram for explaining the gap misalignment.

A concept about a gap will be explained below. FIG. 15A illustrates a gap. The fixed frame 102 and the movable frame 104 are disposed to be spaced at a predetermined gap via balls 110 interposed therebetween, and the movable frame 104 is urged toward the fixed frame 102 by the urging springs 108 attached to the fixed frame 102. Thus, the gap is basically configured so that the balls 110 are always in contact with the fixed frame 102 and the movable frame 104 by the urging force of the urging springs 108. Strictly, however, it is difficult to attach the movable frame 104 to the fixed frame 102 in parallel. For example, when the fixed frame 102 and the movable frame 104 are produced, the surface on which the movable frame 104 is in contact with the ball 110 and the surface on which the fixed frame 102 is in contact with the ball 110 may be inclined with respect to each other as shown in FIG. 15B. Because of the inclination, the gap between the fixed frame 102 and the movable frame 104 may be nonuniform from place to place. Since the amount of the gap between the fixed frame 102 and the movable frame 104 is not uniform, the amount of the magnetic flux from the drive coil 116 received by the magnet 112 varies. The variance of the magnetic flux appears as a false position signal output from the Hall element 118.

Figure 16:
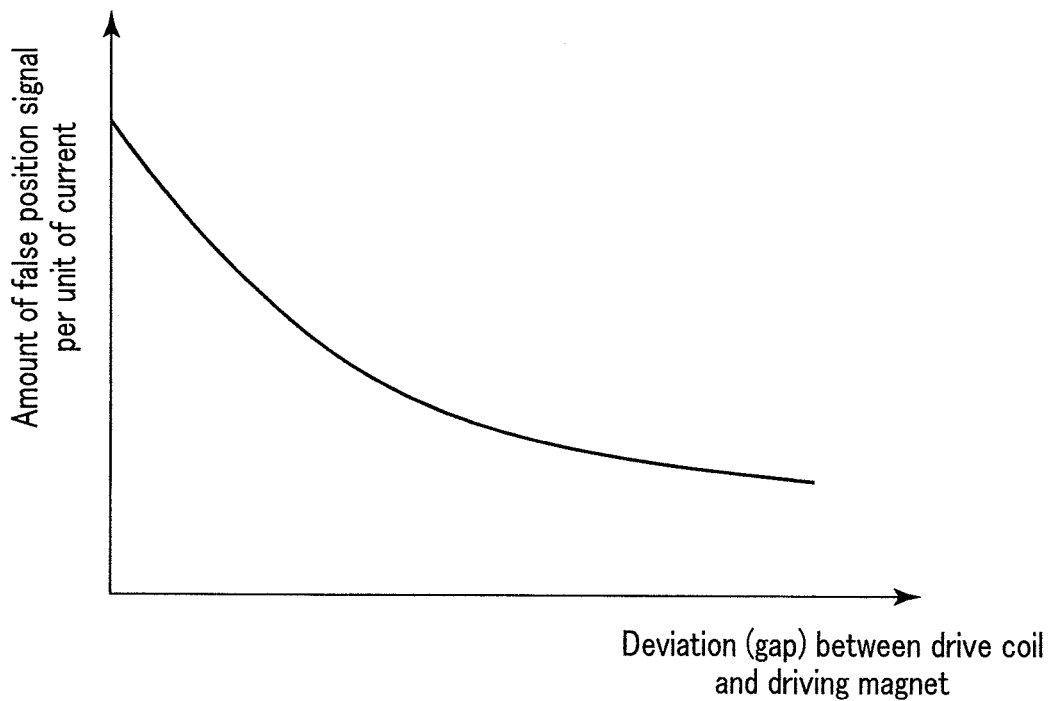
FIG. 16 is a diagram showing a dependence of an amount of a false position signal on a gap amount.

FIG. 16 is a diagram showing a dependence of an amount of a false position signal on a gap amount. The horizontal axis in FIG. 16 represents an amount of a gap between the magnet 112 and the drive coil 116. The vertical axis in FIG. 16 represents an amount of a false position signal per unit of current. As shown in FIG. 16, the greater the amount of the gap between the magnet 112 and the drive coil 116, the less the amount of the false position signal.

Figure 17:
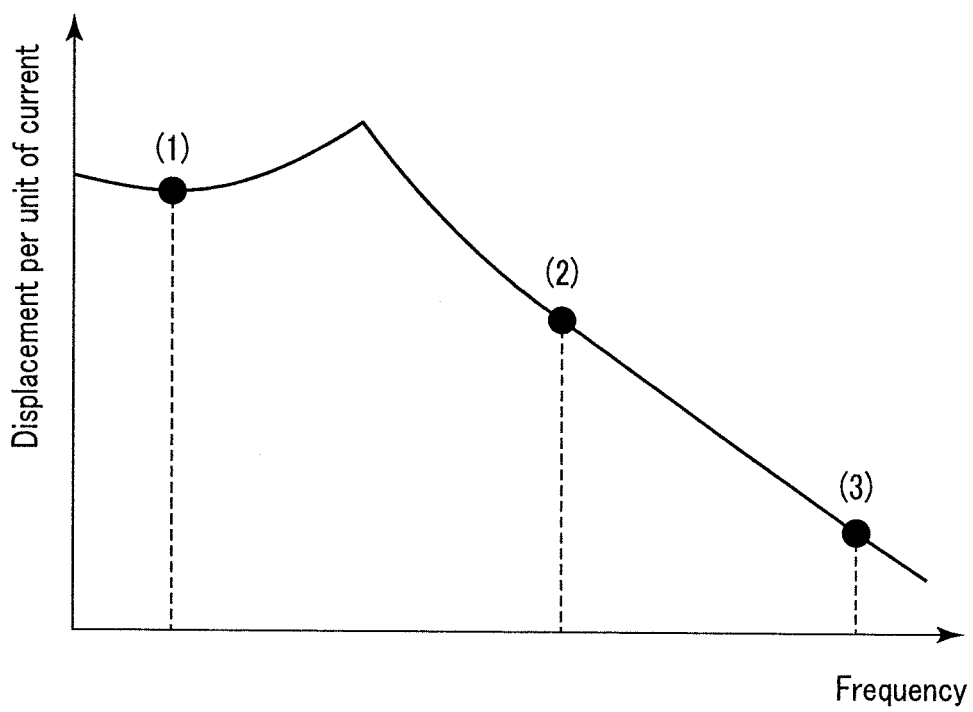
FIG. 17 is a diagram showing a drive characteristic (transmission characteristic) of a motor (VCM).

FIG. 17 is a diagram showing a drive characteristic (transmission characteristic) of the motor (VCM) 206. In FIG. 17, the horizontal axis represents a frequency of a current applied to the drive coil 116, and the vertical axis represents a displacement of the movable frame 104 per unit of current. The characteristic shown in FIG. 17 is represented by a transfer function that is expressed in a formula (1). In the formula (1), $X(s)/I(s)$ represents a displacement (one dimensional) per unit of current, s represents a Laplace operator, $\zeta$ an attenuation coefficient, and $\omega_n$ a frequency. The actual displacement of the movable frame 104 also depends on the amplitude of a drive current. Specifically, the actual displacement of the movable frame 104 is a product of the displacement per unit of current and the amplitude of a drive current.

$$\frac{X(s)}{I(s)} = \frac{\omega_n^2}{s^2 + 2\zeta\omega_n s + \omega_n^2} \quad \text{formula (1)}$$

As shown in FIG. 17, the motor 206 has different drive characteristics respectively in (1) a low-frequency band, (2) a mid-frequency band, and (3) a high-frequency band. In the low-frequency band, the displacement of the movable frame 104 per unit of current is large. In the mid-frequency band, the displacement of the movable frame 104 per unit of current is moderate. In the high-frequency band, the displacement of the movable frame 104 per unit of current is small.

FIG. 18A is a diagram showing (1) a drive current in the low-frequency band, (2) a drive current in the mid-frequency band, and (3) a drive current in the high-frequency band. In FIG. 18A, amplitudes of the respective drive currents are the same. FIG. 18B is a diagram showing displacements of the movable frame 104 that respectively occur when the drive currents shown in FIG. 18A are applied to the motor 206 (the drive coil 116).

In the low-frequency band, since the displacement per unit of current is large as shown in FIG. 17, when the drive current of the amplitude shown in FIG. 18A is applied to the motor 206, a large displacement as shown in FIG. 18B occurs. Similarly, in the mid-frequency band, since the displacement per unit of current is moderate as shown in FIG. 17, when the drive current of the amplitude shown in FIG. 18A is applied to the motor 206, a moderate displacement as shown in FIG. 18B occurs. However, in the high-frequency band shown in FIG. 17, the motor 206 cannot follow the drive current. Therefore, in the high-frequency band, even if the amplitude of the drive current is increased, the displacement is negligible as shown in FIG. 18B. As will be described in detail later, in this embodiment, a false position signal in accordance with the shift or gap misalignment between the fixed frame 102 and the movable frame 104 is detected using a drive current in a high-frequency band. At this time, it is not desirable that the displacement of the movable frame 104 due to the drive current to detect a false position signal affects an image produced via the imaging element 114. Therefore, "the high frequency" in this embodiment is preferably a frequency in which the displacement of the movable frame 104 does not affect an image produced via the imaging element 114. Specifically, "the high frequency" in this embodiment is preferably a frequency in which the displacement of the movable frame 104 falls within a range of one pixel of the imaging element 114.

Figure 19:
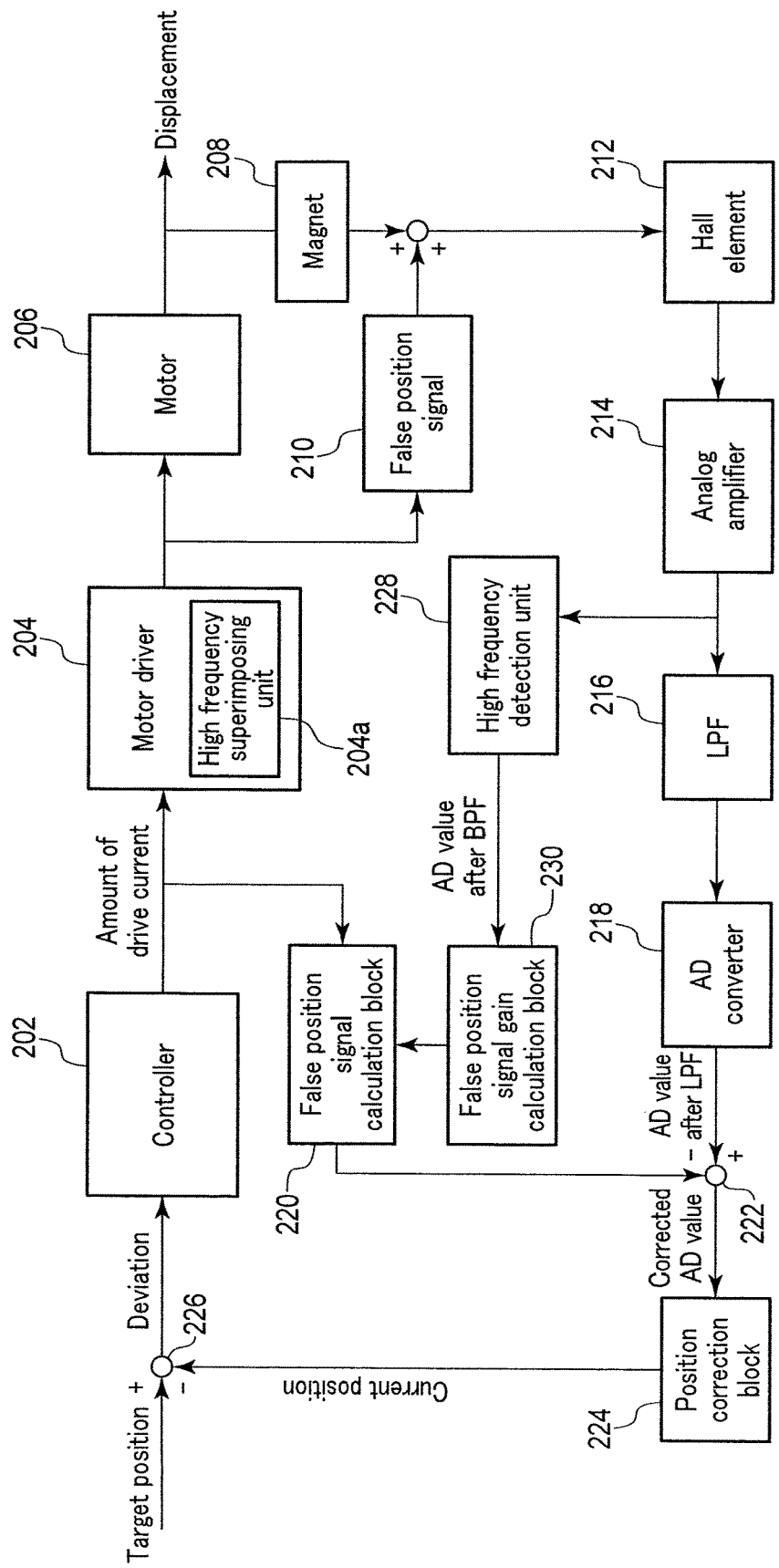
FIG. 19 is a block diagram showing a configuration of a position control system of the camera shake correction unit of the imaging device according to the embodiment.

FIG. 19 is a block diagram showing a configuration of a position control system of the camera shake correction unit 23 of the imaging device 1 according to the embodiment. Configurations that are the same as those shown in FIG. 28 are specified by the same reference symbols as those in FIG. 28, and explanations thereof are omitted as appropriate.

Figure 20A:
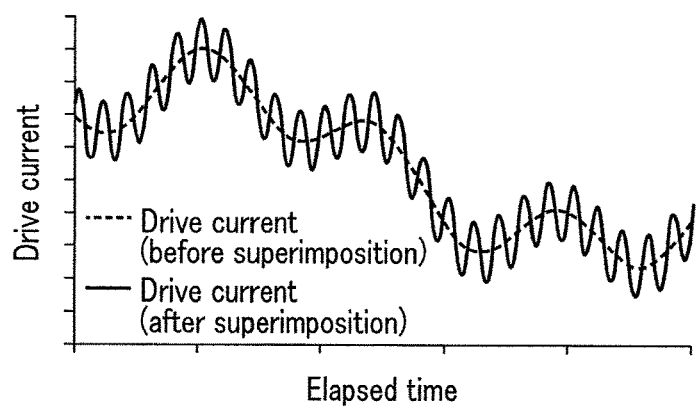
FIG. 20A is a diagram showing drive signals output from a motor driver.

The motor driver 204 of this embodiment includes a high frequency superimposing unit 204a The high frequency superimposing unit 204a includes, for example, a high frequency oscillator, and applies to the motor 206 a drive signal in which a high-frequency drive current (high-frequency drive signal) is superimposed on a drive current corresponding to a drive signal from the controller 202. FIG. 20A is a diagram showing drive signals output from the motor driver 204 in this embodiment. A broken line in FIG. 20A represents a drive current that flows before superimposition of a high-frequency drive current. A solid line in FIG. 20A represents a drive current that flows after superimposition of a high-frequency drive current. As described before, the drive current to drive the motor 206 is the drive current in the low-frequency band indicated by (1) in FIG. 17, and the high-frequency drive current is the drive current in the high-frequency band indicated by (3) in FIG. 17. In this embodiment, (1) the drive current in the low-frequency band is assumed to be several tens of Hz or lower; (2) the drive current in the mid-frequency band is assumed to be from several tens of Hz to 1 kHz; and (3) the drive current in the high-frequency band is assumed to be a value that is higher than 1 kHz and that suppresses the displacement of the movable frame 104 to a range smaller than the pixel pitch (that is, the displacement of the movable frame 104 is negligible). However, since the frequencies in the low, mid, and high frequency bands are relative values, they are not limited to the numerical values mentioned above.

Figure 20B:
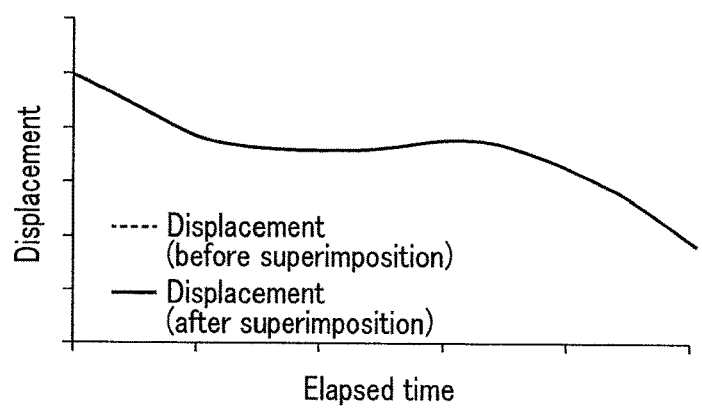
FIG. 20B is a diagram showing a displacement of the movable frame when the drive currents shown in FIG. 20A are applied to the motor.

The motor 206 is driven in accordance with a drive signal on which a high-frequency drive current is superimposed. As described above, the high-frequency drive current affects almost nothing on the displacement of the movable frame 104. FIG. 20B is a diagram showing a displacement of the movable frame 104 that occurs when the drive currents shown in FIG. 20A are applied to the motor 206. A broken line in FIG. 20B represents a displacement of the movable frame 104 that occurs when the drive current before superimposition of the high-frequency drive current is applied to the motor 206. A solid line in FIG. 20B represents a displacement of the movable frame 104 that occurs when the drive current after superimposition of the high-frequency drive current is applied to the motor 206. Since the high-frequency drive current affects almost nothing on the displacement of the movable frame 104 as described above, the displacement of the movable frame 104 is almost the same before and after the superimposition of the high-frequency drive current.

Figure 20C:
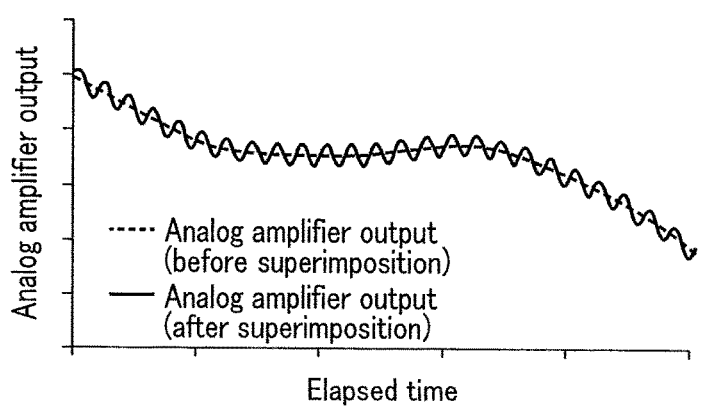
FIG. 20C is a diagram showing outputs of an analog amplifier when the drive currents shown in FIG. 20A are applied to the motor.

FIG. 20C is a diagram showing outputs of the analog amplifier 214 that are output when the drive currents shown in FIG. 20A are applied to the motor 206. As described above, the Hall element 212 detects not only a change in magnetic flux based on the displacement of the movable frame 104 relative to the fixed frame 102 but also a magnetic flux from the drive coil 116. Although the displacement of the movable frame 104 is negligible when the high-frequency drive current is applied to the motor 206, a magnetic flux based on the high-frequency drive current occurs in the drive coil 116. The Hall element 212 outputs a detection signal including a detection signal based on the magnetic flux that is generated in the drive coil 116 by application of a high-frequency drive current. The analog amplifier 214 amplifies a detection signal output from the Hall element 212 including the high-frequency component of the signal. A broken line in FIG. 20C represents an output that is output from the analog amplifier 214 when the drive current before superimposition of the high-frequency drive current is applied to the motor 206. A solid line in FIG. 20C represents an output that is output from the analog amplifier 214 when the drive current after superimposition of the high-frequency drive current is applied to the motor 206.

The output of the analog amplifier 214 is input to the LPF 216. The LPF 216 removes the high-frequency component from the output of the analog amplifier 214 and outputs a filtered output.

Figure 21:
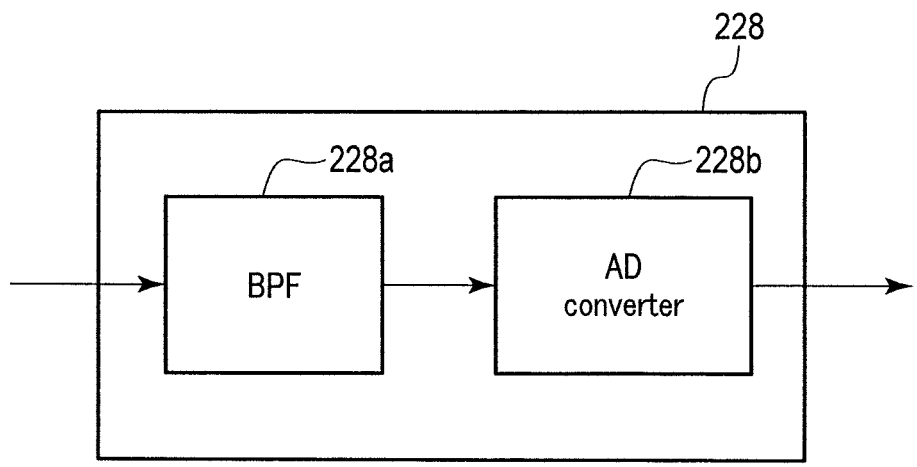
FIG. 21 is a diagram showing a configuration of an example of a high frequency detection unit.
Figure 22:
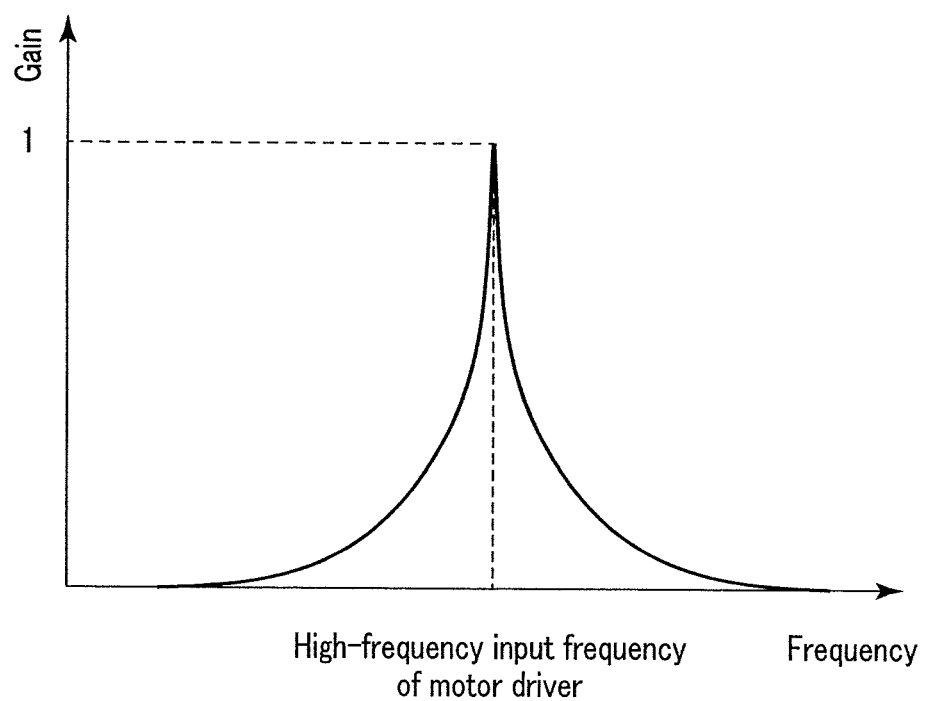
FIG. 22 is a diagram showing a frequency characteristic of a BPF.

The output of the analog amplifier 214 is also input to a high frequency detection unit 228. FIG. 21 shows a configuration of an example of the high frequency detection unit 228. As shown in FIG. 21, the high frequency detection unit 228 includes a band pass filter (BPF) 228a and an AD converter 228b. The BPF 228a is a filter to which a frequency characteristic is set to allow passage of a signal having a frequency of the high-frequency drive current as shown in FIG. 22. In other words, the BPF 228a acquires, from the output of the analog amplifier 214, a predetermined high-frequency signal corresponding to the frequency of the high-frequency drive current superimposed on a low-frequency wave or a mixed wave of a low-frequency wave and a mid-frequency wave. The AD converter 228b converts the high-frequency signal output from the BPF 228a to a digital signal. The AD converter 228b outputs an AD value of the high-frequency signal to a false position signal gain calculation block 230.

The false position signal gain calculation block 230, together with the false position signal calculation block 220, functions as a noise signal calculation unit. The false position signal gain calculation block 230 calculates a false position signal gain to correct the false position signal from the AD value of the high-frequency signal extracted by the high frequency detection unit 228. The value of the gain of the false position signal is 1 at maximum. The false position signal calculation block 220 calculates a false position signal in accordance with the false position signal gain calculated in the, false position signal gain calculation block 230 and the amount of the drive current, that is, the drive signal output from the controller 202. The subtractor 222 as a signal correction unit subtracts a value of the false position signal calculated in the false position signal calculation block 220. The subtractor 222 outputs the subtraction result to the position correction block 224 as a corrected AD value.

The configurations shown in FIG. 19 are the same as those shown in FIG. 28 except those described above. Therefore, explanations thereof are omitted.

A method for calculating a false position signal gain in this embodiment will be described below. As described above, the displacement of the movable frame 104 is negligible even when the high-frequency drive current is applied to the motor 206. Therefore, the detection signal in the frequency band of the high-frequency drive current does not depend on the displacement of the movable frame 104, but depends on the amount of the drive current flowing through the drive coil 116 and the distance between the driving magnet 112 and the drive coil 116 (the shift amount and the gap amount). As shown in FIG. 23, the amplitude of the signal output from the BPF 228a varies depending on the distance between the driving magnet 112 and the driving coil 116, even if the amount of the driving current does not vary. A false position signal gain can be calculated from the amplitude of the signal.

FIG. 24 is a flowchart showing a process for calculating a false position signal gain. The processing of FIG. 24 is executed at a frequency of twice or higher than the frequency of the high-frequency drive current. This is because the sampling frequency of the AD converter 228b must be twice or higher than the frequency of the high-frequency drive current in order to correctly AD convert the high-frequency component of the detection signal by the AD converter 228b.

In step S1, the high frequency detection unit 228 detects a high-frequency component of the detection signal output from the Hall element 212 and amplified by the analog amplifier 214. More specifically, in the high frequency detection unit 228, the BPF 228a acquires a high-frequency component corresponding to the frequency of the high-frequency drive current in the detection signal, and the AD converter 228b converts the acquired high-frequency component of the detection signal to a digital signal and outputs the digital signal to the false position signal gain calculation block 230.

In step S2, the false position signal gain calculation block 230 determines whether or not acquisition of the high-frequency component for one cycle has been completed. If it is determined that acquisition of the high-frequency component for one cycle has not completed in step S2, the processing is ended. If it is determined that acquisition of a high-frequency component for one cycle has completed in step S2, the processing proceeds to step S3.

In step S3, the false position signal gain calculation block 230 calculates a false position signal gain. A false position signal gain G as a false position signal coefficient is calculated from a formula (2) below, where A represents a drive current amplitude of a high-frequency drive signal generated by the high frequency superimposing unit 204a of the motor driver 204, and H represents an AD value of the amplitude of the detection signal output from the high frequency detection unit 228. The drive current amplitude A is set to be predetermined amplitude; it may be a fixed value. From the formula (2), it is considered that the high-frequency component of the detection signal is a false position signal itself, and does not depend on the displacement of the movable frame 104. Therefore, a false position signal gain can be calculated from the amplitude of the high-frequency component of the detection signal. After the calculation of the false position signal gain, the processing is ended.

$$G=H/A \qquad \text{formula (2)}$$

Figure 25:
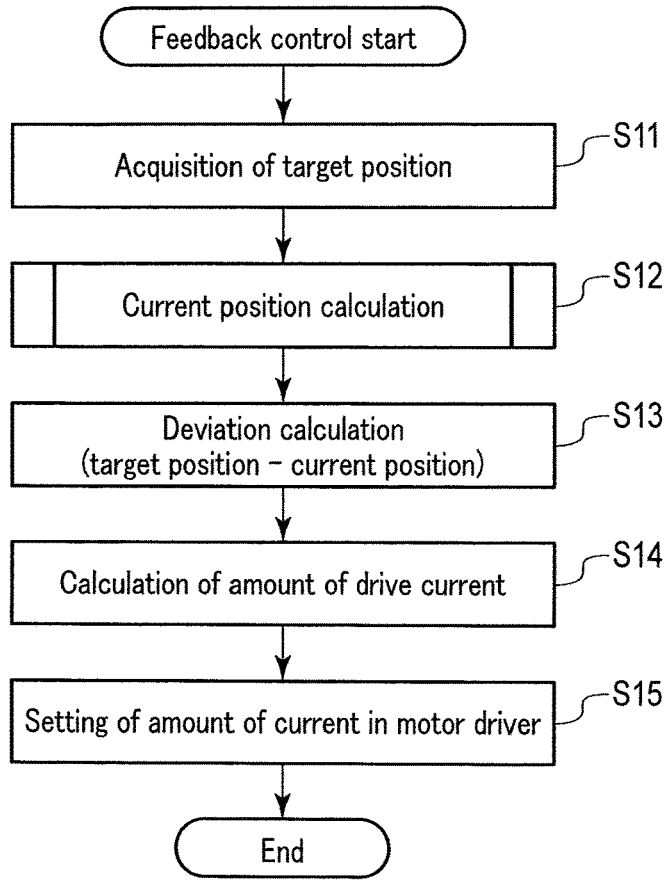
FIG. 25 is a flowchart of feedback control in the imaging device shown in FIG. 19.

Operations of the position control system shown in FIG. 19 will be described below. FIG. 25 is a flowchart of feedback control in the position control system shown in FIG. 19. During the processing shown in FIG. 25, the processing for calculating a false position signal gain shown in FIG. 24 is performed. The processing of FIG. 25 need not be performed at such a high speed as in the processing of FIG. 24. For example, the processing of FIG. 25 can be performed at such a frequency that allows feedback control to be performed.

In step S11, a target position is acquired. The target position is input to the subtractor 226 from, for example, the control circuit 26. For example, the target position is set in accordance with the amount of camera shake.

Figure 26:
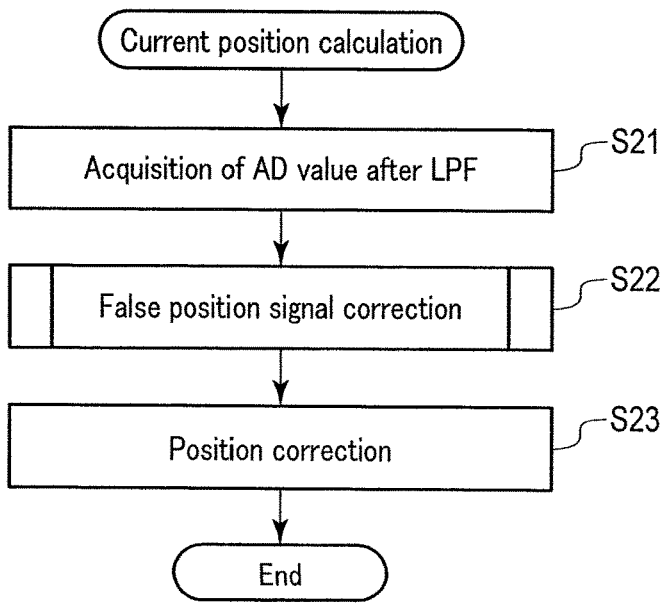
FIG. 26 is a flowchart of a process for calculating a current position.

In step S12, the current position calculation processing is performed. In the following, the current position calculation processing will be described with reference to FIG. 26.

In step S21, the subtractor 222 acquires the AD value that was LPF-processed in the LPF 216. As described before, the AD value is an AD value of a detection signal that does not include a detection signal component based on a high-frequency drive signal.

Figure 27:
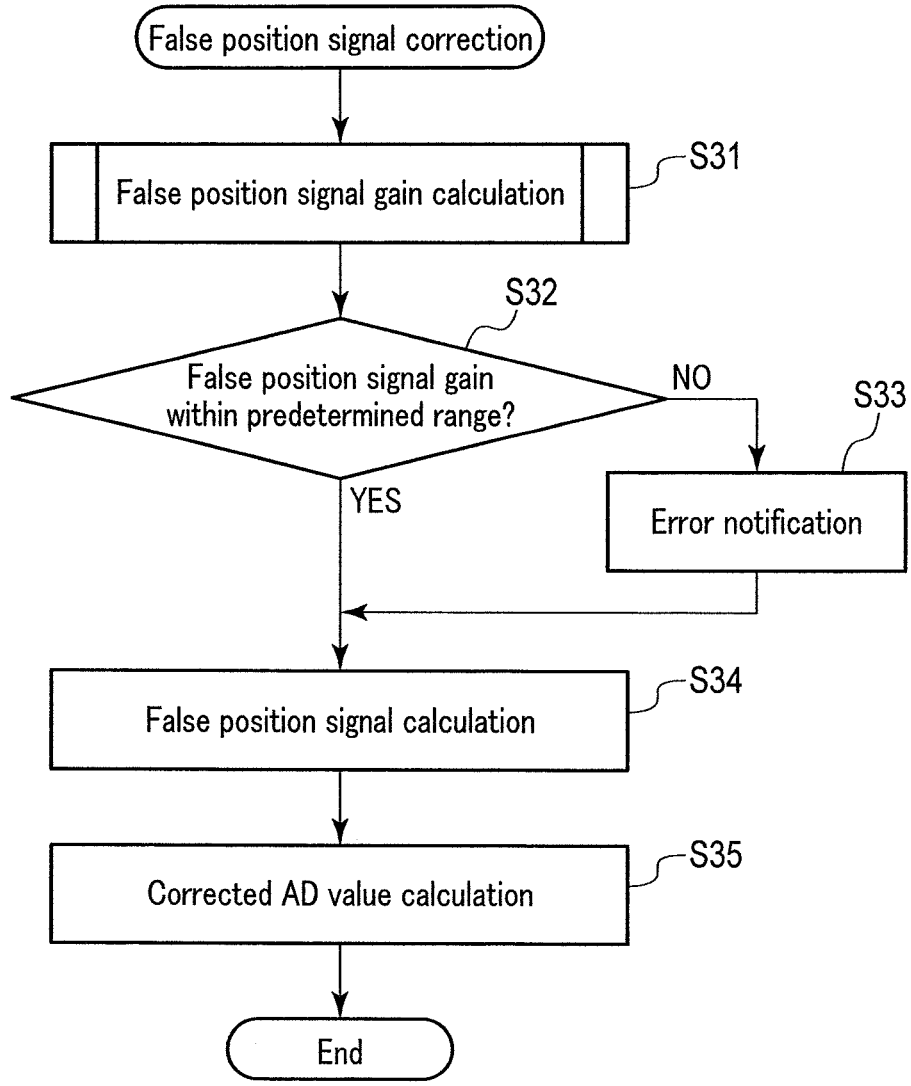
FIG. 27 is a flowchart of a process for correcting a false position signal.

In step S22, false position signal correction processing is performed. In the following, the false position signal correction processing will be described with reference to FIG. 27.

In step S31, the false position signal gain calculation block 230 calculates a false position signal gain. The processing in step S31 is the processing shown in FIG. 24.

In step S32, the false position signal calculation block 220 acquires the false position signal gain calculated in the false position signal gain calculation block 230. In step S32, the latest one of the false position signal gains successively calculated in step S31 is acquired. Then, the false position signal gain calculation block 230 determines whether or not the acquired false position signal gain falls within a predetermined range. If it is determined that the acquired false position signal gain does not fall within the predetermined range in step S32, the processing proceeds to step S33. If it is determined that the acquired false position signal gain falls within the predetermined range in step S32, the processing proceeds to step S34.

When the false position signal gain exceeds the predetermined range in step S32, the variation of the amplitude of the false position signal is too large or too small. Generally, the variation of the amount of shift or gap occurs within a certain range. Therefore, when the variation of the amplitude of the false position signal is too large or too small, it is considered that the cause of the variation of the amplitude of the false position signal is not the variation of the amount of shift or gap; for example, the cause may be a malfunction of the motor 206 itself. In such a case, the processing proceeds to step S33, and an error notification is made using, for example, the monitor 24. After the error notification, the processing proceeds to step S34. The error notification includes a message to the effect that, for example, a camera shake correction cannot be performed or a drive current correction cannot be performed. Furthermore, the feedback control itself may be stopped in step S33. In this case as well, it is desirable to make an error notification.

In step S34, the false position signal calculation block 220 calculates a false position signal. The false position signal F is expressed by the following formula (3), where I represents the amount of a drive current:

$$F=I \times G \qquad \text{formula (3)}$$

In step S35, the subtractor 222 calculates the corrected AD value. The corrected AD value H' is calculated from the following formula (4) using the AD value B, namely, the AD value that was LPF-processed and output from the AD converter 218. Then, the processing is ended.

$$H'=B-F \qquad \text{formula (4)}$$

Referring back to FIG. 26, after the false position signal correction in step S22, the position correction block 224 corrects the corrected AD value in step S23. Then, the processing is ended. The position correction block 224 corrects an error due to a temperature characteristic or the like in the corrected AD value, and generates a current position signal.

Referring back to FIG. 25, after the current position signal is calculated in step S12, the subtractor 226 calculates a deviation between the target position and the current position in step S13. The deviation signal output from the subtractor 226 is input to the controller 202. In step S14, the controller 202 generates a drive signal indicative of a value of the drive current to drive the motor 206. In step S15, the drive signal is input to the motor driver 204 from the controller 202. As a result, the amount of the drive current in the motor driver 204 is set, and the motor 206 (actually, the drive coil 116) is driven in accordance with the amount of the drive current. The feedback control shown in FIG. 25 is repeated, so that the movable frame 104 reaches the target position.

As described above, according to the embodiment, the motor 206 is driven by the drive current of the motor 206 on which the high-frequency drive current is superimposed. The detection signal output from the Hall element 212 includes a detection signal generated from the drive coil 116 in addition to the detection signal due to a change in magnetic flux based on the displacement of the movable frame 104. However, in the high-frequency band of the detection signal, the influence of the detection signal generated from the drive coil 116 becomes dominant. Therefore, by acquiring an amplitude component of the detection signal in the high-frequency band, even if the distance (the amount of shift and gap) between the magnet 112 and the drive coil 116 varies, an accurate false position signal can be detected. Accordingly, an accurate false position signal gain including a variation of the distance (the amount of the shift and gap) between the magnet 112 and the drive coil 116 can be calculated. Thus, the position signal can be corrected adaptively and accurately in consideration of the variation of the distance (the amount of the shift and gap) between the magnet 112 and the drive coil 116.

In the embodiment, the frequency of the high-frequency drive current is a frequency in which the displacement of the movable frame 104 falls within a range of one pixel of the imaging element 114. Because of this frequency, the image quality is not affected by superimposing the high-frequency drive current on the drive current.

Although the present invention has been described based on the embodiment, the invention is not limited to the embodiment, and various modifications or applications may be made without departing from the spirit or scope of the general inventive concept of the present invention. For example, the configuration of the camera shake correction unit 23 described above is a mere example, but can be modified as appropriate. For example, the VCM may have a different configuration. In the example described above, the magnets are disposed on the fixed frame and the Hall elements are disposed on the movable frame. Instead, the magnets may be disposed on the movable frame and the Hall elements may be disposed on the fixed frame. Furthermore, the camera shake correction unit 23 may be configured to move the optical system 11 instead of the imaging element 114. Moreover, the camera shake correction unit 23 may be used for a purpose other than the camera shake correction processing. For example, the camera shake correction unit 23 may be used for super-resolution processing.

Each of the processes of the embodiment described above may be stored as a program that can be executed by the CPU or the like as a computer. Alternatively, that can be stored and distributed in a storage medium of an external storage device, such as a memory card, a magnetic disk, an optical disk, and a semiconductor memory. The CPU or the like can read the program stored in the storage medium of the external storage device, and controls operations in accordance with the read program, so that the processing described above can be executed.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A drive device comprising:
   a fixed frame on which one of a drive coil and a magnet facing the drive coil is disposed;
   a movable frame on which another one of the drive coil and the magnet is disposed and which is movable relative to the fixed frame;
   a detector that is disposed on one of the fixed frame and the movable frame on which the drive coil is disposed, and that detects and outputs a detection signal corresponding to a magnetic flux of the magnet;
   a noise signal calculation unit that calculates a noise signal corresponding to a magnetic flux generated from a current flowing through the drive coil;
   a signal correction unit that corrects the detection signal detected by the detector based on the noise signal; and
   a drive controller that controls, based on a corrected signal obtained from correction by the signal correction unit, a drive signal to be applied to the drive coil and that drives the movable frame to a position corresponding to the corrected signal,
   wherein the noise signal calculation unit acquires an amplitude of a predetermined frequency band including a frequency of the high-frequency drive signal, and calculates the noise signal included in the detection signal based on the acquired amplitude.

2. The drive device according to claim 1, wherein:
   the noise signal included in the detection signal is represented by a product of the current I flowing through the drive coil and a false position signal coefficient G; and
   where an amplitude of the high-frequency drive signal is represented by A and the acquired amplitude of the predetermined frequency band is represented by H, the false position signal coefficient G is expressed by: $G=H/A$.

3. The drive device according to claim 2, wherein: where the corrected signal is represented by H', the corrected signal H' relative to a detection signal B that is uncorrected and acquired by the detector is expressed by: $H'=B-I\times G$.

4. The drive device according to claim 1, further comprising: an imaging element that is disposed in the movable frame and that generates a video signal relating to an object; and a display unit that displays an image based on the video signal,
   wherein the predetermined frequency of the high-frequency drive signal is a frequency that makes an amount of movement of the movable frame fall within a range of one pixel of the imaging element.

5. The drive device according to claim 1, further comprising: an imaging element that is disposed in the movable frame and that generates a video signal relating to an object; and a display unit that displays an image based on the video signal,
   wherein when the false position signal coefficient G has a value out of a predetermined range, the noise signal calculation unit displays an error notification that the current I flowing through the drive coil is uncorrectable.

6. A method for controlling a drive device comprising: a fixed frame on which one of a drive coil and a magnet facing the drive coil is disposed; a movable frame on which another one of the drive coil and the magnet is disposed and which is movable relative to the fixed frame; and a detector that is disposed on one of the fixed frame and the movable frame on which the drive coil is disposed, and that detects and outputs a detection signal corresponding to a magnetic flux of the magnet, the method comprising:
   applying a drive signal, in which a high-frequency drive signal is superimposed on a drive current to drive the movable frame, to the drive coil;
   acquiring an amplitude of a predetermined frequency band including a frequency of the high-frequency drive signal from the detection signal detected by the detector;
   calculating a noise signal included in the detection signal based on the acquired amplitude;
   correcting the detection signal detected by the detector based on the noise signal; and
   controlling, based on a corrected signal obtained from the correcting, a drive signal to be applied to the drive coil and driving the movable frame to a position corresponding to the corrected signal.

* * * * *